(12) United States Patent
Murata et al.

(10) Patent No.: US 9,597,745 B2
(45) Date of Patent: Mar. 21, 2017

(54) CONSTRICTING NOZZLE AND TIG WELDING TORCH USING THIS NOZZLE

(71) Applicant: Akihisa Murata, Osaka (JP)

(72) Inventors: Akihisa Murata, Osaka (JP); Manabu Tanaka, Osaka (JP); Shigeru Nakayama, Chiba (JP)

(73) Assignee: Akihisa Murata, Osaka (JP)

(*) Notice: Subject to any disclaimer, the term of this patent is extended or adjusted under 35 U.S.C. 154(b) by 796 days.

(21) Appl. No.: 13/731,927

(22) Filed: Dec. 31, 2012

(65) Prior Publication Data

US 2013/0277337 A1    Oct. 24, 2013

Related U.S. Application Data

(63) Continuation-in-part of application No. PCT/JP2012/002659, filed on Apr. 18, 2012.

(51) Int. Cl.
| | | |
|---|---|---|
| *B23K 9/167* | (2006.01) | |
| *B23K 9/16* | (2006.01) | |
| *B23K 9/29* | (2006.01) | |

(52) U.S. Cl.
CPC .............. *B23K 9/164* (2013.01); *B23K 9/167* (2013.01); *B23K 9/296* (2013.01)

(58) Field of Classification Search
CPC ...... B23K 9/167; H05B 6/642; H05B 6/6423; H05B 6/6429

(Continued)

(56) References Cited

U.S. PATENT DOCUMENTS

| | | | | | |
|---|---|---|---|---|---|
| 4,788,401 | A | * | 11/1988 | Kleppen ................ | B23K 9/296 219/137.42 |
| 5,591,356 | A | * | 1/1997 | Sakuragi .................. | H05H 1/34 219/121.48 |
| 6,525,288 | B2 | * | 2/2003 | Rehrig ................... | B23K 9/167 219/74 |

FOREIGN PATENT DOCUMENTS

| | | |
|---|---|---|
| JP | 56-157351 | 11/1981 |
| JP | 58-66085 U | 5/1983 |

(Continued)

OTHER PUBLICATIONS

International Search Report issued in corresponding International application PCT/JP2012/002659 completed on Jul. 28, 2012 and mailed Jul. 31, 2012.

(Continued)

*Primary Examiner* — Tu B Hoang
*Assistant Examiner* — Thomas Ward
(74) *Attorney, Agent, or Firm* — Griffin and Szipl PC

(57) ABSTRACT

The constricting nozzle of the present invention includes (i) a cylindrical nozzle body disposed around the forward end of the tungsten electrode rod concentrically with the tungsten electrode rod and defines an annular high-speed gas passage between the nozzle body and the outer peripheral surface of the forward end of the tungsten electrode rod, (ii) a plurality of positioning projections that are protrudently formed on the inner peripheral surface of the nozzle body with predetermined intervals in the circumferential direction and that are arranged along the longitudinal direction of the nozzle body to hold the tungsten electrode rod in the center position of the nozzle body, and (iii) a plurality of gas-flow regulating grooves formed between the positioning projections and that extend in parallel in the longitudinal direction of the nozzle body and regulate the shielding gas (G) flowing through the high-speed gas passage.

6 Claims, 15 Drawing Sheets

(58) Field of Classification Search
USPC .. 219/75, 50, 72, 74, 76.1–77, 78.14, 61.12, 219/145.21, 146.21
See application file for complete search history.

(56) References Cited

FOREIGN PATENT DOCUMENTS

| | | | |
|---|---|---|---|
| JP | 7-68382 | A | 3/1995 |
| JP | 7-227673 | A | 8/1995 |
| JP | 11-123558 | A | 5/1999 |
| JP | 11-138264 | A | 5/1999 |
| JP | 3163559 | B2 | 3/2001 |
| JP | 2007-144427 | A | 6/2007 |
| JP | 4327153 | B2 | 6/2009 |

OTHER PUBLICATIONS

Tungsten Inert Gas Welding (TIG), Instituto Superior Tecnico (2007).
Kobelco Welding Today, vol. 1, No. 4, pp. 1-10, Oct. 1998.
Random House Webster's College Dictionary 1346 (1991).

* cited by examiner

FIG.8
(A)
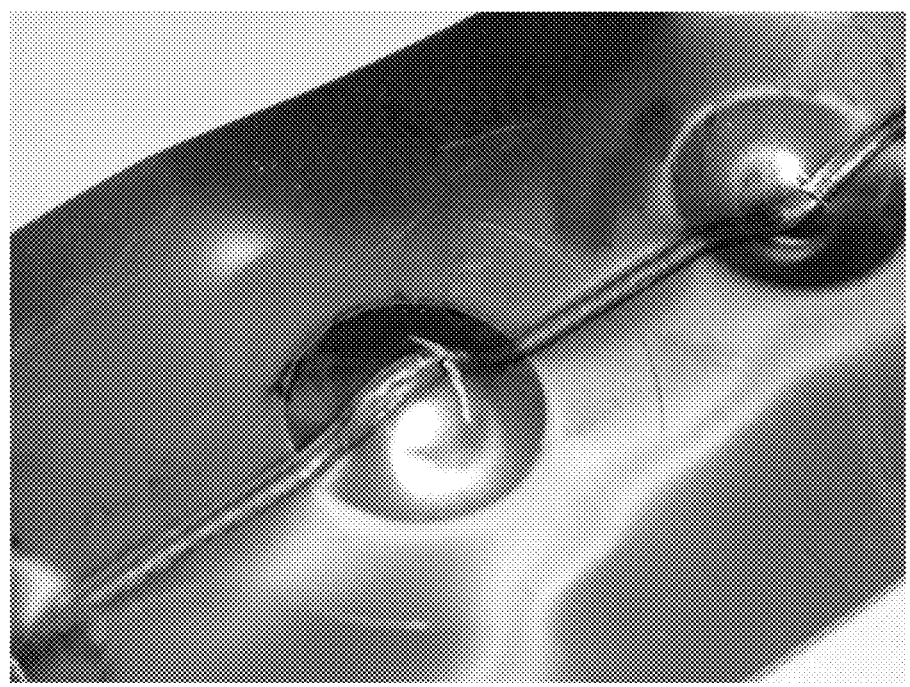
(B)
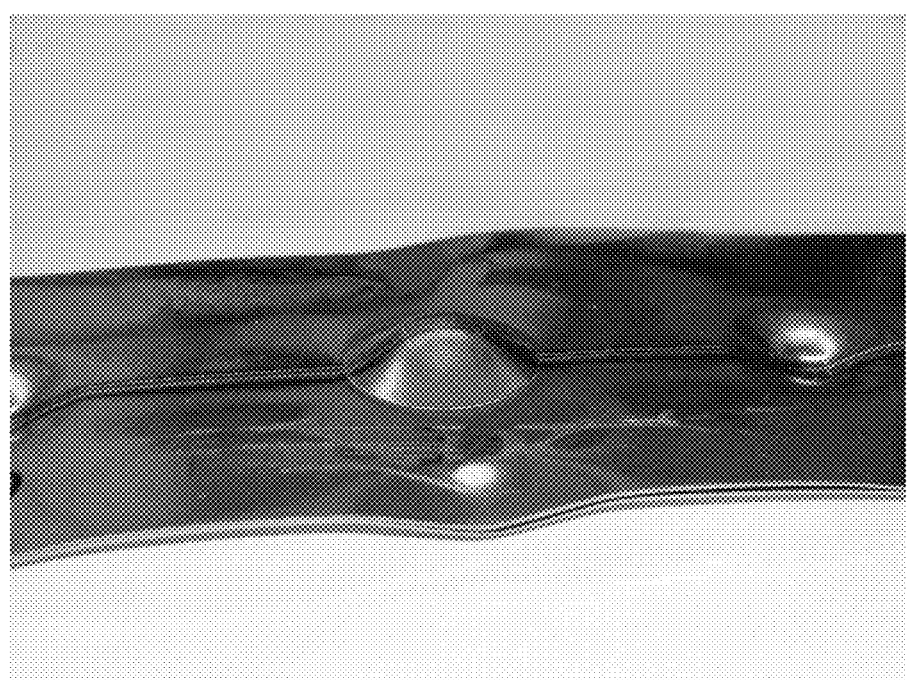

CONSTRICTING NOZZLE AND TIG WELDING TORCH USING THIS NOZZLE

This is a Continuation-in-Part Application in the United States of International Patent Application No. PCT/JP2012/002659 filed Apr. 18, 2012. The entire disclosure of the above patent application is hereby incorporated by reference.

TECHNICAL FIELD OF THE INVENTION

The present invention relates to a constricting nozzle attached to a tungsten inert gas (TIG) welding torch used in TIG welding in which, chiefly, ends of thin metal sheets, such as stainless steel sheets or magnetic steel sheets, are butted and welded together and a TIG welding torch using this nozzle, and, more particularly, relates to a constricting nozzle and a TIG welding torch using this nozzle in which (a) the constricting nozzle is disposed around the forward end of a tungsten electrode rod, a plasma airflow is accelerated by allowing a linear high-speed regulated gas or a swirling high-speed regulated gas to flow from the constricting nozzle toward the surroundings of an arc, the energy density of the arc, the directivity of the arc, and the rigidity (also termed “retentivity”) of the arc are heightened while strengthening an electromagnetic force and a magnetic field that act on the arc, thus making it possible to perform high-speed welding, and (b) the shielding effect of welded parts is improved by a shielding gas, such as argon gas or helium gas, thus making it possible to perform high-quality welding, and (c) a tungsten electrode rod can be attached to its original position easily and accurately during replacement of the tungsten electrode rod with another, thus making it possible to improve reproducibility and workability.

BACKGROUND OF THE INVENTION

Including Art

Generally, a TIG (tungsten inert gas) welding method is used to generate an arc (arc plasma) between a tungsten electrode rod and a parent material to be welded while allowing a shielding gas, such as argon gas, to flow toward the surroundings of the tungsten electrode rod so as to melt the parent material with the heat of the arc. This method is widely used as an important junction technique in the manufacturing premises that use metallic materials.

However, the TIG welding method has the following problems (1) to (5) in comparison with other welding methods (for example, a plasma welding method, a laser welding method, and an electron beam welding method):

(1) The TIG welding method is inferior in welding ability and welding strength to other welding methods such as the plasma welding method;

(2) The TIG welding method is high in cost because a tungsten electrode rod or an argon gas used as a shielding gas is relatively costly;

(3) The TIG welding method has a lower shielding effect because a shielding gas is susceptible to wind during welding. If the shielding effect is low, a blackish burn will be produced on a “second weld part” (which denotes a heat-affected zone occurring in a parent material portion because of welding heat, and is an area in which the organization, or metal structure, of the parent material has been changed by quickly heating and cooling with the welding heat), or an oxide film will be generated on a bead surface;

(4) The TIG welding method will destabilize an arc if an arc length is not shortened when welding is performed by use of a small electric current; and (5) The TIG welding method will produce an undercut (groove) in the second weld part if welding speed is increased.

On the other hand, for example, a TIG welding torch (Patent Document 1) that uses a cylindrical shielding nozzle to discharge a shielding gas, such as argon gas, and a TIG welding torch (Patent Document 2) that uses the above-mentioned shielding nozzle and a constricting nozzle to heighten the energy density of an arc have been known as TIG welding torches used in the TIG welding method.

FIG. 18 shows one example of a conventional TIG welding torch that uses a shielding nozzle. This TIG welding torch has a structure in which an electrode collet 22 that holds and fixes a tungsten electrode rod 21 is inserted in a torch body 20, and a ceramic shielding nozzle 23 through which a shielding gas G, such as argon gas, is discharged is attached to a front end of the torch body 20 so that the shielding gas G that has flowed through the inside of the torch body 20 is laminarized (i.e., is formed into a laminar flow) by a gas lens 24. The gas lens 24 is composed of, for example, filters and is disposed at a forward end of the torch body 20, so that the laminarized shielding gas G is allowed to flow from the shielding nozzle 23 toward a parent material to be welded, and so that the parent material is melted by the heat of an arc (arc plasma) generated between the tungsten electrode rod 21 and the parent material in the atmosphere of the shielding gas G.

FIG. 19 shows one example of another conventional TIG welding torch that uses the shielding nozzle 23 and a constricting nozzle 25. This TIG welding torch has a structure in which an electrode collet (not shown) that holds and fixes a tungsten electrode rod 21 is inserted in a torch body (not shown). The TIG welding torch also includes a ceramic shielding nozzle 23 through which a shielding gas G, such as argon gas, is discharged is attached to a front end of the torch body, and, furthermore, a tapered constricting nozzle 25, whose diameter is smaller than that of the shielding nozzle 23, is attached to a forward end of the shielding nozzle 23 so that the shielding gas G is allowed to concentratedly flow from the constricting nozzle 25 toward the surroundings of an arc (arc plasma) generated between the tungsten electrode rod 21 and a parent material, and so that the energy density of the arc is heightened by a thermal pinch effect brought about by the shielding gas G.

However, also in the conventional TIG welding torch that uses the shielding nozzle 23 and the constricting nozzle 25, it is impossible to solve all of the above-mentioned problems in TIG welding. The following problems reside in this conventional TIG welding torch.

For example, a TIG welding torch using the shielding nozzle 23 merely diffuses and discharges a shielding gas G from the front end of the shielding nozzle 23 having a relatively large inner diameter and, therefore, the concentration of the shielding gas G around an arc is lowered, and the arc becomes unstable without obtaining a high energy density. Therefore, disadvantageously, the welding speed must be decreased, and the arc is inferior in, for example, directivity.

Additionally, a TIG welding torch using the shielding nozzle 23 and the constricting nozzle 25 allows a shielding gas G to concentratedly flow from the constricting nozzle 25 toward the surroundings of an arc and, therefore, the energy density of the arc becomes higher than in the TIG welding torch using only the shielding nozzle 23. Therefore, the welding speed can be increased, and the arc becomes excellent in directivity, and yet, on the contrary, the shielding effect is lowered due to a reduction in the discharge range of the shielding gas G, and, disadvantageously, the welding quality is lowered. Still, additionally, when the tungsten electrode rod 21 is replaced with another, it is difficult to set the tungsten electrode rod 21 in an original position (i.e., in a center position of the constricting nozzle 25), and, disadvantageously, this torch using the shielding nozzle 23 and the constricting nozzle 25 is inferior in reproducibility and workability.

Therefore, in TIG welding torches used in the TIG welding method, it is desirable to develop a welding torch using a new nozzle that solves all of the above-mentioned problems residing in the TIG welding method.

PRIOR ART DOCUMENTS

Patent Documents

Patent Document 1: Japanese Patent No. 3163559.
Patent Document 2: Japanese Patent No. 4327153.

Problems to be Solved by the Invention

The present invention has been made in consideration of the above-mentioned problems, and it is an object of the present invention to provide a constricting nozzle capable of accelerating the flow of a plasma airflow by allowing a linear high-speed regulated gas, or a swirling high-speed regulated gas, to flow toward the surroundings of an arc, and capable of performing high-speed welding while heightening the energy density of the arc, the directivity of the arc, and the rigidity of the arc, by strengthening an electromagnetic force and a magnetic field that act on the arc. The constricting nozzle is also capable of performing high-quality welding while improving the shielding effect of welded parts by use of a shielding gas, such as argon gas or helium gas, and capable of improving reproducibility and workability by which a tungsten electrode rod can be attached to its original position easily and accurately during replacement of the tungsten electrode rod with another, and to provide a TIG welding torch using this nozzle.

SUMMARY OF THE INVENTION

Means for Solving the Problems

To achieve the object, the invention according to a first aspect is characterized in that, in a constricting nozzle that is attached to a TIG welding torch by which a shielding gas that has flowed through an inside of a torch body is laminarized by a gas lens disposed at a forward end of the torch body, by which the laminarized shielding gas is discharged from a cylindrical shielding nozzle disposed at the forward end of the torch body toward a parent material to be welded, by which an arc is generated between the parent material and a tungsten electrode rod disposed in a center position of the shielding nozzle in an atmosphere of the shielding gas, and by which the parent material is melted by heat of the arc. The constricting nozzle is composed of a cylindrical nozzle body that is disposed around a forward end of the tungsten electrode rod concentrically with the tungsten electrode rod and the cylindrical nozzle body defines an annular high-speed gas passage between the cylindrical nozzle body and an outer peripheral surface of the forward end of the tungsten electrode rod. The constricting nozzle is also composed of a plurality of positioning projections that are protrudently formed on an inner peripheral surface of the nozzle body at predetermined intervals in a circumferential direction and that hold the tungsten electrode rod in a center position of the nozzle body, and a plurality of gas-flow regulating grooves that are formed between the positioning projections and that regulate the shielding gas flowing through the high-speed gas passage, in which a part of the shielding gas discharged from the torch body is allowed to flow through the high-speed gas passage, and is changed into a high-speed regulated gas that is faster than the laminarized shielding gas discharged from the shielding nozzle, and the high-speed regulated gas is allowed to flow from an opening of a front end of the nozzle body toward surroundings of an arc. In this context, the surroundings of the arc pertain to the environment and/or adjacent area of the arc.

The invention according to a second aspect is characterized in that, in the invention according to the first aspect, the plurality of positioning projections and the plurality of gas-flow regulating grooves are respectively formed linearly along a longitudinal direction of the nozzle body, and a linear high-speed regulated gas is allowed to flow from the opening of the front end of the nozzle body toward the surroundings of the arc.

The invention according to a third aspect is characterized in that, in the invention according to the first aspect, the plurality of positioning projections and the plurality of gas-flow regulating grooves are respectively formed spirally, and a swirling high-speed regulated gas is allowed to flow from the opening of the front end of the nozzle body toward the surroundings of the arc.

The invention according to a fourth aspect is characterized in that, in the invention according to any one of the first to third aspects, the positioning projection and the gas-flow regulating groove are formed apart from the front end of the nozzle body, and an inner diameter of the high-speed gas passage positioned downstream of the positioning projection and the gas-flow regulating groove is larger than an inner diameter of the high-speed gas passage positioned upstream of the positioning projection and the gas-flow regulating groove, and a flow of the high-speed regulated gas that has passed through the gas-flow regulating groove is stabilized at a downstream-side part or portion of the high-speed gas passage.

The invention according to a fifth aspect is characterized in that, in the invention according to any one of the first to fourth aspects, the plurality of gas-flow regulating grooves are evenly disposed on the inner peripheral surface of the nozzle body so that the high-speed regulated gas evenly flows from the opening of the front end of the nozzle body toward the surroundings of the arc.

The invention according to a sixth aspect is characterized in that, in the invention according to any one of the first, second, and fourth aspects, the plurality of gas-flow regulating grooves are disposed on the inner peripheral surface of the nozzle body so that a large amount of high-speed regulated gas flows from the opening of the front end of the nozzle body toward a mutually facing position around the arc.

The invention according to a seventh aspect is characterized in that, in a constricting nozzle that is attached to a TIG welding torch by which a shielding gas that has flowed through an inside of a torch body is laminarized by a gas lens disposed at a forward end of the torch body, by which the laminarized shielding gas is discharged from a cylindrical shielding nozzle disposed at the forward end of the torch body toward a parent material W to be welded, by which an arc is generated between the parent material and a tungsten electrode rod disposed in a center position of the shielding nozzle in an atmosphere of the shielding gas, and by which the parent material is melted by heat of the arc. The constricting nozzle is composed of a cylindrical nozzle body that is disposed around a forward end of the tungsten electrode rod concentrically with the tungsten electrode rod and the cylindrical nozzle body defines an annular high-speed gas passage between the cylindrical nozzle body and an outer peripheral surface of the forward end of the tungsten electrode rod. The constricting nozzle is also composes of a cylindrical spiral metal piece that is inserted in an inside of a forward end of the nozzle body, which holds the tungsten electrode rod by an inner peripheral surface thereof in a center position of the nozzle body, and the spiral metal piece has a plurality of spiral gas-flow regulating grooves on an outer peripheral surface thereof, wherein the spiral gas-flow regulating grooves regulate and swirl the shielding gas flowing through the high-speed gas passage, in which a part of the shielding gas discharged from the torch body is allowed to flow through the high-speed gas passage, and is changed into a swirling high-speed regulated gas that is faster than the laminarized shielding gas discharged from the shielding nozzle, and the swirling high-speed regulated gas is allowed to flow from an opening of a front end of the nozzle body toward surroundings of an arc.

The invention according to an eighth aspect is characterized in that, in the invention according to the seventh aspect, the spiral metal piece is inserted and set in a position apart from the front end of the nozzle body, and an inner diameter of the high-speed gas passage positioned downstream of the spiral metal piece is larger than an inner diameter of the high-speed gas passage positioned upstream of the spiral metal piece, and a flow of the swirling high-speed regulated gas that has passed through the spiral gas-flow regulating groove is stabilized at a downstream-side part of the high-speed gas passage.

The invention according to a ninth aspect is characterized in that, in the invention according to the seventh or eighth aspect, the plurality of spiral gas-flow regulating grooves are evenly disposed on the outer peripheral surface of the spiral metal piece, and the swirling high-speed regulated gas is allowed to evenly flow from the opening of the front end of the nozzle body toward the surroundings of the arc.

The invention according to a tenth aspect is characterized in that a TIG welding torch is composed of a cylindrical torch body, an electrode collet that is screwed and inserted into the torch body so as to be movable up and down and so as to be rotatable and that attachably and detachably holds a tungsten electrode rod, a collet handle that is attached to an upper end of the electrode collet and that moves the electrode collet upwardly and downwardly with respect to the torch body while rotating the electrode collet in normal and reverse directions, a gas lens that is detachably attached to a lower end of the torch body and that homogenizes, diffuses, and laminarizes a shielding gas that has flowed through an inside of the torch body, a cylindrical shielding nozzle that is detachably attached to the gas lens or to the torch body in a state of surrounding a forward end of the tungsten electrode rod and that discharges the shielding gas laminarized by the gas lens toward surroundings of an arc, and the constricting nozzle according to any one of the first to ninth aspects disposed around the forward end of the tungsten electrode rod.

The invention according to an eleventh aspect is characterized in that, in the invention according to the tenth aspect, the constricting nozzle is detachably attached to a center position of a forward end surface of the gas lens.

Effects of the Invention

The constricting nozzle according to the first aspect of the present invention is composed of a cylindrical nozzle body that is disposed around a forward end of the tungsten electrode rod concentrically with the tungsten electrode rod and that defines an annular high-speed gas passage between the cylindrical nozzle body and an outer peripheral surface of the forward end of the tungsten electrode rod, a plurality of positioning projections that are protrudently formed on an inner peripheral surface of the nozzle body at predetermined intervals in a circumferential direction and that hold the tungsten electrode rod in a center position of the nozzle body, and a plurality of gas-flow regulating grooves that are formed between the positioning projections and that regulate the shielding gas flowing through the high-speed gas passage, so that a part of the shielding gas discharged from the torch body is allowed to flow through the high-speed gas passage, and is changed into a high-speed regulated gas that is faster than the laminarized shielding gas discharged from the shielding nozzle, and so that the high-speed regulated gas is allowed to flow from an opening of a front end of the nozzle body toward surroundings of an arc. Therefore, the following highly advantageous effects can be fulfilled:

(1) In detail, in the constricting nozzle according to the first aspect of the present invention, a part of the shielding gas is changed into a high-speed regulated gas that is faster than the laminarized shielding gas discharged from the shielding nozzle, and the high-speed regulated gas is allowed to flow toward surroundings of an arc and, therefore, the speed of a plasma airflow that flows toward a parent material to be welded from the side of the tungsten electrode rod reaches a speed (i.e., about 200 to 300 m/sec) two times to three times as high as a conventional speed (e.g., about 100 m/sec), and the energy density of the arc, the directivity of the arc, and the rigidity of the arc are heightened while strengthening an electromagnetic force and a magnetic field that act on the arc, thus making it possible to obtain a stable arc. As a result, in the constricting nozzle according to the first aspect of the present invention, it is possible to perform high-speed welding at a welding speed (e.g., 1000 mm/min to 7000 mm/min) five times to twenty times as high as the conventional welding speed, and to perform high-quality stable welding in which the bead width is uniform on the obverse and reverse sides and in which the waveform intervals of the bead are equal.

(2) In the constricting nozzle according to the first aspect of the present invention, the shielding gas is allowed to flow in the form of a high-speed regulated gas, and high-speed welding can be performed, and, therefore, the shielding gas is never influenced by wind during welding, and crystals are prevented from becoming coarse by rapid heating and rapid cooling of a heat-affected zone, and the bending ductility of a weld metal is improved.

(3) In the constricting nozzle according to the first aspect of the present invention, metallic vapors (impurities) generated from a molten pool because of a high-speed plasma airflow can be prevented from re-adhering to, and re-mixing with, a molten metal, and high-quality welding can be performed.

(4) In the constricting nozzle according to the first aspect of the present invention, a shielding gas is discharged in the form of a high-speed regulated gas by narrowing down the shielding gas by means of the nozzle body and, therefore, the shielding gas becomes satisfactorily small in the amount used, and costs can be reduced.

(5) In the constricting nozzle according to the first aspect of the present invention, a shielding gas is allowed to flow at a high speed toward the surroundings of the tungsten electrode rod and, therefore, a rise in temperature of the tungsten electrode rod is prevented, and the high-speed regulated gas discharged from the front end of the constricting nozzle prevents metallic vapors, or the like, generated from the inside of a molten pool from adhering to the forward end of the tungsten electrode rod, and, therefore, the lifetime of the tungsten electrode rod can be lengthened.

(6) In the constricting nozzle according to the first aspect of the present invention, a plurality of positioning projections that are protrudently formed on an inner peripheral surface of the nozzle body, and hold the tungsten electrode rod in a center position of the nozzle body are provided, and, therefore, the tungsten electrode rod can be set at its original position (i.e., a center position of the constricting nozzle) accurately and reliably during replacement of the tungsten electrode rod with another tungsten electrode rod, and the reproducibility of the mounting position of the tungsten electrode rod is improved, and workability is improved.

In the constricting nozzle according to the second aspect of the present invention, the plurality of positioning projections and the plurality of gas-flow regulating grooves are respectively formed linearly along a longitudinal direction of the nozzle body, and a linear high-speed regulated gas is allowed to flow from the opening of the front end of the nozzle body toward the surroundings of the arc, and, therefore, the operational effects mentioned in the items (1) to (6) listed above can be fulfilled.

In the constricting nozzle according to the third aspect of the present invention, the plurality of positioning projections and the plurality of gas-flow regulating grooves are respectively formed spirally, and a swirling high-speed regulated gas is allowed to flow from the opening of the front end of the nozzle body toward the surroundings of the arc, and, therefore, the arc becomes tauter by means of the swirling high-speed regulated gas, and the operational effects mentioned in the items (1) to (6) listed above can be obtained reliably and excellently. Additionally, in the constricting nozzle according to the third aspect of the present invention, a swirling high-speed regulated gas that has collided with the surface of a parent material quickly wraps and discharges metallic vapors generated from a molten pool to the outside, and, therefore, the shielding effect of a molten metal is enhanced, and the metallic vapors can be prevented from re-adhering to, and re-mixing with, the molten metal, and hence a high-quality weld metal can be produced.

In the constricting nozzle according to the fourth aspect of the present invention, the positioning projection and the gas-flow regulating groove are formed apart from the front end of the nozzle body, and an inner diameter of the high-speed gas passage positioned downstream of the positioning projection and the gas-flow regulating groove is larger than an inner diameter of the high-speed gas passage positioned upstream of the positioning projection and the gas-flow regulating groove, and, therefore, the flow of the high-speed regulated gas that has passed through the gas-flow regulating grooves is stabilized at a downstream-side part or portion of the high-speed gas passage, and a turbulent flow is prevented from being generated. As a result, high-quality stable welding can be performed reliably and excellently.

In the constricting nozzle according to the fifth aspect of the present invention, the plurality of gas-flow regulating grooves are evenly disposed on the inner peripheral surface of the nozzle body so that the high-speed regulated gas evenly flows from the opening of the front end of the nozzle body toward the surroundings of the arc, and, therefore, a plasma airflow flowing from the tungsten electrode rod toward the parent material evenly runs, and it is possible to form a circular arc whose cross-sectional shape has high circularity, and the arc becomes stable during welding.

In the constricting nozzle according to the sixth aspect of the present invention, the plurality of gas-flow regulating grooves are disposed on the inner peripheral surface of the nozzle body so that a large amount of high-speed regulated gas flows from the opening of the front end of the nozzle body toward a mutually facing position around the arc, and, therefore, an arc whose cross-sectional shape is elliptical and that has a high energy density can be formed. If an arc whose cross-sectional shape is elliptical is formed in this way, the preheating effect will be enhanced, and the weld penetration will be enhanced, and an "Uranami" (penetration bead) will easily occur.

The constricting nozzle according to the seventh aspect of the present invention is composed of a cylindrical nozzle body that is disposed around a forward end of the tungsten electrode rod concentrically with the tungsten electrode rod and that defines an annular high-speed gas passage between the cylindrical nozzle body and an outer peripheral surface of the forward end of the tungsten electrode rod, and a cylindrical spiral metal piece that is inserted in an inside of a forward end of the nozzle body, that holds the tungsten electrode rod by an inner peripheral surface thereof in a center position of the nozzle body, and that has a plurality of spiral gas-flow regulating grooves on an outer peripheral surface thereof, wherein the spiral gas-flow regulating grooves regulate and swirl the shielding gas flowing through the high-speed gas passage, in which a part or portion of the shielding gas discharged from the torch body is allowed to flow through the high-speed gas passage, and is changed by a spiral metal piece into a swirling high-speed regulated gas that is faster than the laminarized shielding gas discharged from the shielding nozzle, and the swirling high-speed regulated gas is allowed to flow from an opening of a front end of the nozzle body toward surroundings of an arc, and, therefore, the same operational effects as in the constricting nozzle according to the first and third aspects can be fulfilled.

In the constricting nozzle according to the eighth aspect of the present invention, the spiral metal piece is inserted and set in a position apart from the front end of the nozzle body, and an inner diameter of the high-speed gas passage positioned downstream of the spiral metal piece is larger than an inner diameter of the high-speed gas passage positioned upstream of the spiral metal piece, and a flow of the swirling high-speed regulated gas that has passed through the spiral gas-flow regulating groove is stabilized at a downstream-side part or portion of the high-speed gas passage, and, therefore, a turbulent flow is prevented from being generated. As a result, high-quality stable welding can be performed reliably and excellently.

In the constricting nozzle according to the ninth aspect of the present invention, the plurality of spiral gas-flow regulating grooves are evenly disposed on the outer peripheral surface of the spiral metal piece, and the swirling high-speed regulated gas is allowed to evenly flow from the opening of the front end of the nozzle body toward the surroundings of the arc, and, therefore, the swirling high-speed regulated gas becomes stable, and the arc reliably and excellently becomes taut.

The TIG welding torch, according to the tenth aspect of the present invention, includes the constricting nozzle mentioned above and, therefore, each operational effect mentioned above can be fulfilled. Still, additionally, this TIG welding torch can perform dual sealing by means of a high-speed regulated gas that is allowed to flow from the constricting nozzle toward the surroundings of an arc and, by means of a laminarized shielding gas, allowed to flow from the shielding nozzle toward its outside. Therefore, the shielding effect is enhanced, and this makes it possible to reliably prevent air from intruding into a molten pool, and makes it possible to perform welding in which the oxide film of a surface bead is slight, and in which the surface of the bead is lustrous, and this makes it possible to lengthen the lifetime of the tungsten electrode rod.

In the TIG welding torch according to the eleventh aspect of the present invention, the constricting nozzle is detachably attached to a center position of a forward end surface of the gas lens and, therefore, extremely conveniently the constricting nozzle can be easily replaced with another constricting nozzle even when the previous constricting nozzle is burned, or even when the previous tungsten electrode rod is replaced with a tungsten electrode rod having a different diameter.

BRIEF DESCRIPTION OF THE DRAWINGS

FIG. 1 shows the external shape of a TIG welding torch that uses a constricting nozzle according to a first embodiment of the present invention, wherein FIG. 1(A) is a front view of the TIG welding torch, and FIG. 1(B) is a side view of the TIG welding torch.

FIG. 8(A) is an enlarged perspective view of a welded part of stainless steel sheets welded together by use of a conventional constricting nozzle, and FIG. 8(B) is an enlarged perspective view of a welded part of stainless steel sheets welded together by use of the constricting nozzle of the present invention, wherein in both of FIGS. 8(A) and 8(B) the stainless steel sheets are butted and welded together, and the resulting welded part is subjected to an Erichsen test under the same welding conditions by use of the TIG welding torch using the conventional constricting nozzle and by use of the TIG welding torch using the constricting nozzle of the present invention, respectively.

FIGS. 11(A), (B), and (C) are views for describing the principle of the constricting nozzle shown in FIGS. 9 and 10, wherein FIG. 11(A) is a descriptive view of a state in which a strong plasma airflow runs, FIG. 11(B) is a descriptive view of a state in which a weak plasma airflow runs, and FIG. 11(C) is a descriptive view of the cross-sectional shape of an arc when the constricting nozzle shown in FIGS. 9 and 10 is used.

FIGS. 16(A), (B), and (C) show a spiral metal piece used in the constricting nozzle shown in FIGS. 14 and 15, wherein FIG. 16(A) is an enlarged perspective view of the spiral metal piece, FIG. 16(B) is an enlarged front view of the spiral metal piece, and FIG. 16(C) is an enlarged plan view of the spiral metal piece.

FIGS. 17(A), (B), and (C) show a modification of the spiral metal piece, wherein FIG. 17(A) is an enlarged perspective view of the spiral metal piece, FIG. 17(B) is an enlarged front view of the spiral metal piece, and FIG. 17(C) is an enlarged plan view of the spiral metal piece.

DETAILED DESCRIPTION OF THE INVENTION

Modes for Carrying Out the Invention

First Embodiment

Figure 1:
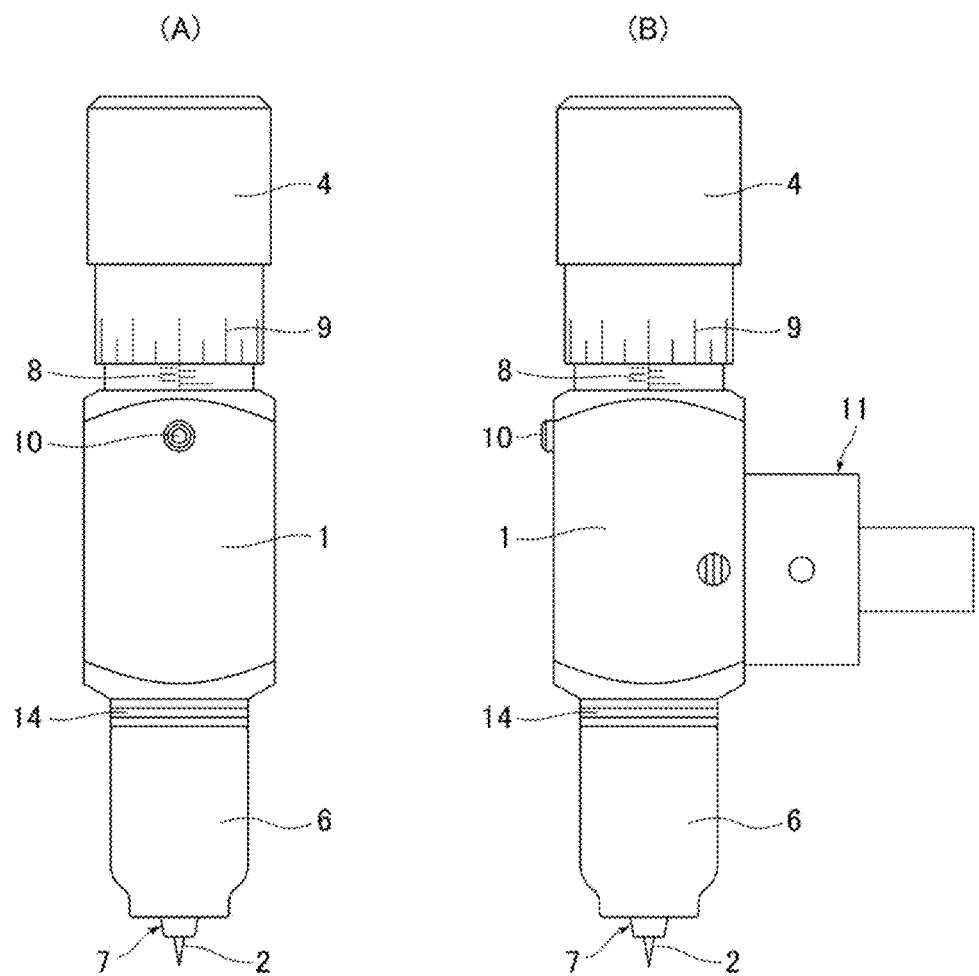

FIG. 1 to FIG. 6 show a constricting nozzle according to a first embodiment of the present invention and a TIG welding torch using this constricting nozzle. Like components are labeled with like character references. The TIG welding torch is chiefly used when ends of thin metal sheets, such as stainless steel sheets or magnetic steel sheets, are butted and welded together, and is composed of a cylindrical torch body 1 that allows a shielding gas G, such as argon gas or helium gas, to flow through its inside, an electrode collet 3 that is screwed and inserted into the torch body 1 from above so as to be movable up and down and be rotatable, and that attachably and detachably holds a tungsten electrode rod 2, a collet handle 4 that is attached to the upper end of the electrode collet 3 and that moves the electrode collet 3 upwardly and downwardly with respect to the torch body 1 while rotating the electrode collet 3 in normal and reverse directions, a gas lens 5 that is detachably attached to the lower end of the torch body 1 and that homogenizes, diffuses, and laminarizes shielding gas G that has flowed through the inside of the torch body 1, a cylindrical shielding nozzle 6 that is detachably attached to the gas lens 5, or to the torch body 1, in a state of surrounding the forward end of the tungsten electrode rod 2 and that discharges the shielding gas G laminarized by the gas lens 5 toward the surroundings (i.e., the environment or adjacent area) of an arc "a," and a constricting nozzle 7 that is disposed around the forward end of the tungsten electrode rod 2 and that allows a linear high-speed regulated gas G3 toward the surroundings of the arc "a."

Figure 2:
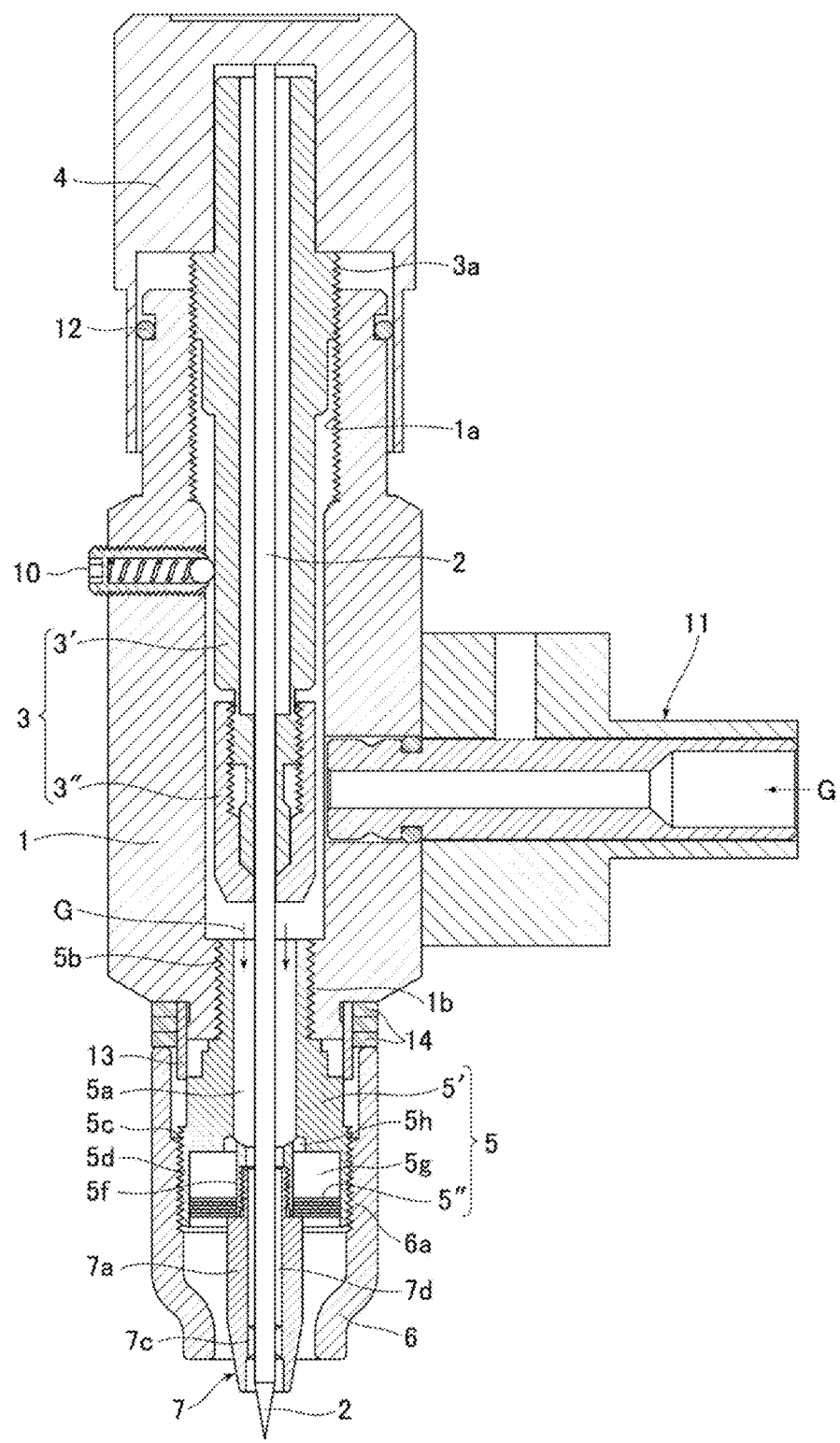
FIG. 2 is a longitudinal sectional view of the TIG welding torch of FIG. 1.

In FIG. 1 and FIG. 2, reference numeral 8 designates a thread gauge that is formed on the outer peripheral surface of the upper end of the torch body 1 and that indicates an amount of up-and-down movement of the electrode collet 3, reference numeral 9 designates a thread gauge that is formed on the outer peripheral surface of the lower end of the collet handle 4 and that indicates an amount of rotation of the collet handle 4, reference numeral 10 designates a pressure adjusting screw that is disposed at the torch body 1 and that holds the electrode collet 3 at an adjusted position by applying appropriate rotational resistance to the electrode collet 3, reference numeral 11 designates an electrode/main-gas-pipe connecting metal piece fixed to the torch body 1, reference numeral 12 designates an O-ring that seals a gap between the torch body 1 and the collet handle 4, reference numeral 13 designates a rubber ring for gas sealing that is interposed between the torch body 1 and the gas lens 5, and reference numeral 14 designates an adjusting ring that is made of plastic and that is interposed between the torch body 1 and the shielding nozzle 6.

As shown in FIG. 1 and FIG. 2, the torch body 1 consists of an angularly cylindrical part made of a metallic material, such as an aluminum alloy, and a circularly cylindrical part contiguously disposed on the upper end of the angularly cylindrical part. The electrode/main-gas-pipe connecting metal piece 11 and the pressure adjusting screw 10 are inserted and fixed to the peripheral wall of the angularly cylindrical part. A female thread 1a to which the electrode collet 3 holding the tungsten electrode rod 2 is screwed and inserted so as to be movable up and down is formed on the inner peripheral surface of an opening of the upper end of the torch body 1, and a female thread 1b to which the gas lens 5 that laminarizes a shielding gas G is screwed and detachably attached is formed on the inner peripheral surface of an opening of the lower end of the torch body 1. A main gas supply pipe and a power cable (not shown) are respectively connected to the electrode/main-gas-pipe connecting metal piece 11.

As shown in FIG. 2, the electrode collet 3 consists of a copper-made collet body 3' and a copper-made cylindrical fastening piece 3". The collet body 3' is formed in a slender cylindrical shape provided with a halved chuck part, and has a male thread 3a that is formed on a part of its outer peripheral surface and that is screwed and attached movably up and down to the female thread 1a disposed on the upper end side of the torch body 1, whereas the cylindrical fastening piece 3" is screwed and detachably attached to the outer peripheral surface of the chuck part of the collet body 3', and fastens the tungsten electrode rod 2 inserted in the collet body 3' while tightening the chuck part. The electrode collet 3 is screwed and inserted into the torch body 1 from above, and is movable up and down in the torch body 1 by rotating the collet handle 4 fixed to the upper end of the collet body 3'.

The gas lens 5 consists of a copper-made holder 5' that has a cylindrical structure and that is detachably attached to the lower end of the torch body 1 and a metallic filter 5" attached to the holder 5'.

Figure 3:
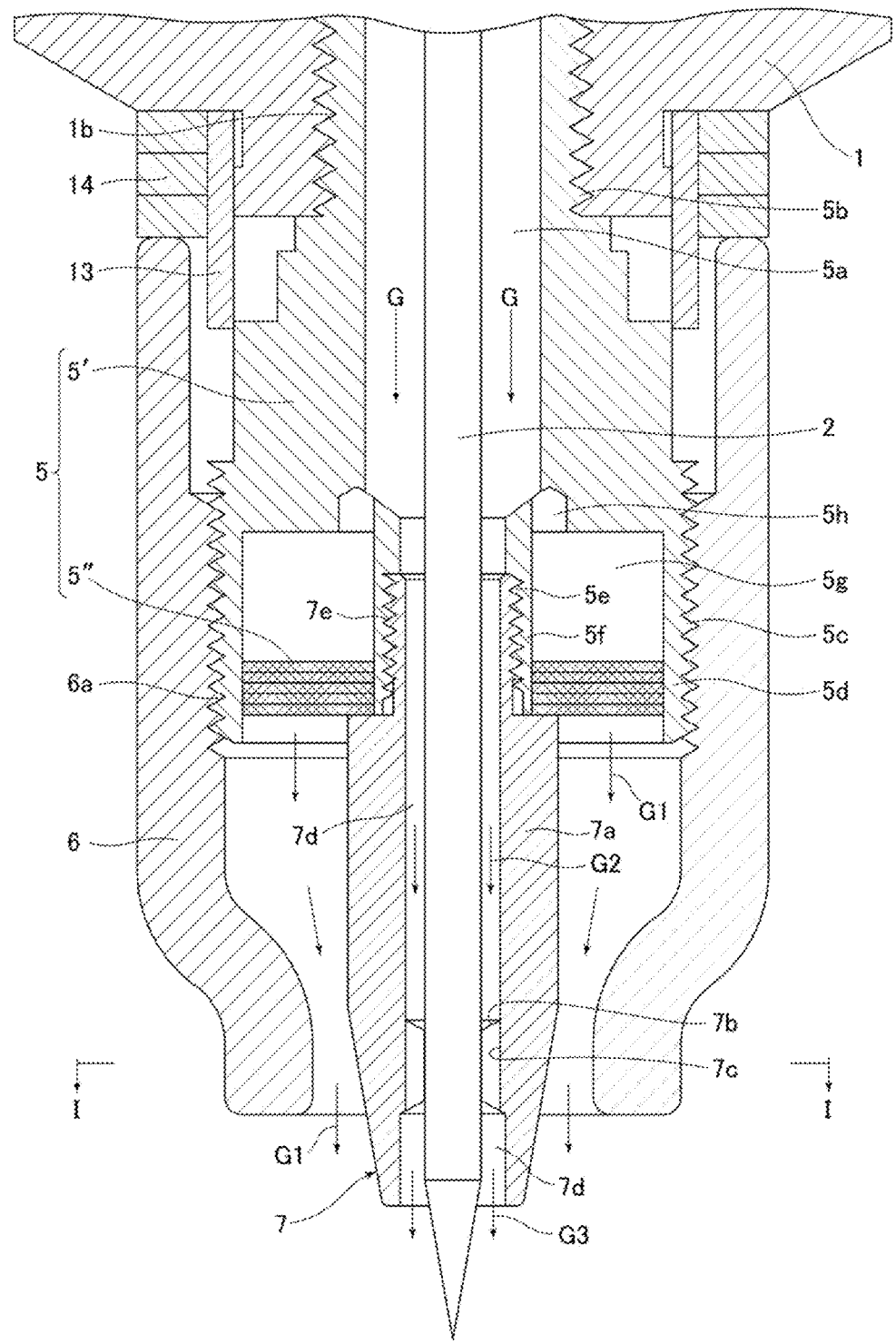
FIG. 3 is an enlarged longitudinal sectional view of a main part of the TIG welding torch of FIG. 2.

In detail, as shown in FIG. 2 and FIG. 3, the holder 5' is formed in a cylindrical shape having a gas passage 5a formed in its center, and has a male thread 5b that is formed on the outer peripheral surface of its upper end and that is screwed and detachably attached to the female thread 1b disposed on the lower end side of the torch body 1. The holder 5' additionally has a cylindrical holding cylinder part 5d and a supporting cylinder part 5f formed at its lower end. The cylindrical holding cylinder part 5d has a male thread 5c, to which the shielding nozzle 6 is screwed and detachably attached, on its outer peripheral surface, whereas the supporting cylinder part 5f is positioned in the middle of the holding cylinder part 5d and has a female thread 5e, to which the constricting nozzle 7 is screwed and detachably attached, on its inner peripheral surface. The space between the holding cylinder part 5d and the supporting cylinder part 5f of the holder 5' is defined as an annular gas chamber 5g that leads to the torch body 1 through a plurality of gas flow holes 5h formed near the base of the supporting cylinder part 5f and through the gas passage 5a of the holder 5'.

On the other hand, the filter 5" is formed by piling together a plurality of wire nets each of which is cut into an annular shape by die cutting, and the filter 5" is attached to the holder 5' by fitting its inner peripheral edge to the supporting cylinder part 5f of the holder 5' and by fitting its outer peripheral edge to the holding cylinder part 5d of the holder 5'. A combination of three 600-mesh wire nets made of stainless steel and two 300-mesh wire nets made of stainless steel is used as the filter 5".

As shown in FIG. 2 and FIG. 3, the shielding nozzle 6 is formed into a cylindrical shape having its forward end narrowed down, and is made with a ceramic material, and has a female thread 6a, which is screwed and detachably attached to the male thread 5c of the holding cylinder part 5d of the gas lens 5, on a part or portion of its inner peripheral surface. The shielding nozzle 6 is attached to the outer peripheral surface of the gas lens 5 by screwing the female thread 6a to the male thread 5c of the holding cylinder part 5d of the gas lens 5, so that a shielding gas G that has passed through the filter 5" of the gas lens 5, and that has been laminarized, is discharged toward the surroundings of the forward end of the tungsten electrode rod 2.

As shown in FIG. 2 and FIG. 3, the constricting nozzle 7 is disposed around the forward end of the tungsten electrode rod 2, and defines an annular high-speed gas passage 7d between the constricting nozzle 7 and the forward end of the tungsten electrode rod 2, so that a part or portion of the shielding gas G flowing through the gas passage 5a of the holder 5' of the gas lens 5 from the inside of the torch body 1 is allowed to flow through the high-speed gas passage 7d, and, hence, is changed into a high-speed regulated gas G3 that is faster than the laminarized shielding gas G flowing from the shielding nozzle 6 toward the surroundings of the constricting nozzle 7. The resulting high-speed regulated gas G3 is allowed to flow toward the surroundings of an arc "a."

In detail, the constricting nozzle 7 is shaped into a cylindrical body made of a copper material (beryllium copper) excellent in electric conductivity, strength, etc., and is composed of, as shown in FIG. 2 to FIG. 6, a cylindrical nozzle body 7a that is disposed around the forward end of the tungsten electrode rod 2 concentrically with the tungsten electrode rod 2 and that defines an annular high-speed gas passage 7d between the nozzle body 7a and the outer peripheral surface of the forward end of the tungsten electrode rod 2, a plurality of positioning projections 7b that are formed to protrude on the inner peripheral surface of the nozzle body 7a with predetermined intervals in the circumferential direction and that are arranged along the longitudinal direction of the nozzle body 7a in order to hold the tungsten electrode rod 2 in the center position of the nozzle body 7a, and a plurality of gas-flow regulating grooves 7c that are formed between the positioning projections 7b and that extend in parallel in the longitudinal direction of the nozzle body 7a so as to regulate the shielding gas G flowing through the high-speed gas passage 7d.

In detail, the nozzle body 7a is formed so as to taper the outer peripheral surface of its forward end (i.e., its lower end), and has a male thread 7e on an end opposite its forward end, which is screwed and detachably attached to the supporting cylinder part 5f of the holder 5' of the gas lens 5, so the male thread 7e is located on the outer peripheral surface of its base (i.e., its upper end). The nozzle body 7a is attached to the center position of the forward end surface of the gas lens 5 by screwing the male thread 7e to the supporting cylinder part 5f. At this time, the nozzle body 7a is disposed around the forward end of the tungsten electrode rod 2 concentrically with the tungsten electrode rod 2 and with the shielding nozzle 6, and defines an annular high-speed gas passage 7d between the nozzle body 7a and the outer peripheral surface of the forward end of the tungsten electrode rod 2.

The positioning projections 7b and the gas-flow regulating grooves 7c are respectively disposed on the inner peripheral surface of the nozzle body 7a at regular intervals of an angle in the circumferential direction, so that a high-speed regulated gas G3 can evenly flow from the opening of the front end of the nozzle body 7a toward the surroundings of an arc "a."

Additionally, the positioning projections 7b and the gas-flow regulating grooves 7c are formed apart from the front end of the nozzle body 7a, and the inner diameter of the high-speed gas passage 7d positioned downstream of the positioning projections 7b and the gas-flow regulating grooves 7c is larger than the inner diameter of the high-speed gas passage 7d positioned upstream of the positioning projections 7b and the gas-flow regulating grooves 7c. As a result, the shielding gas G that has flowed into the high-speed gas passage 7d is regulated by passing through the gas-flow regulating grooves 7c, is then formed into a high-speed regulated gas G3, and is then stabilized at a downstream-side part of the high-speed gas passage 7d, and is subsequently discharged from the opening of the front end of the nozzle body 7a.

Figure 4:
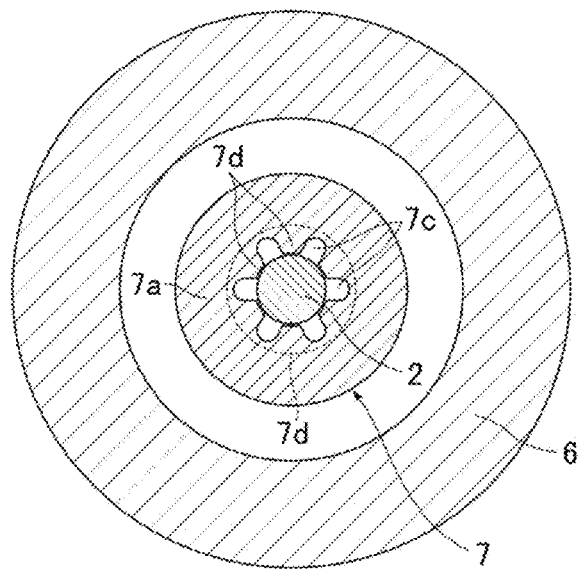
FIG. 4 is a sectional view along line I-I of FIG. 3.
Figure 5:
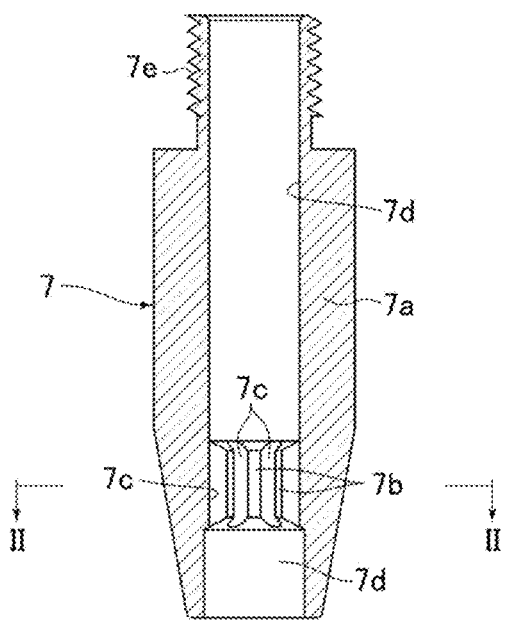
FIG. 5 is an enlarged longitudinal sectional view of the constricting nozzle in accordance with the present invention.
Figure 6:
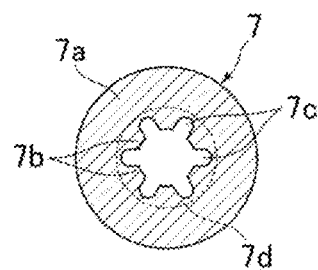
FIG. 6 is a sectional view along line II-II of FIG. 5.

The diameter of the tungsten electrode rod 2 used in the present embodiment is set at 1.6 mm. Additionally, in the present embodiment, the overall length of the constricting nozzle 7 is 18 mm, the outer diameter of a part or portion having the largest diameter is 6 mm, the inner diameter on the base side of the nozzle body 7a is 2.7 mm, the inner diameter on the forward end side of the nozzle body 7a is 3.0 mm, the length of the positioning projection 7b and the length of the gas-flow regulating groove 7c are about 2 mm, the width of the gas-flow regulating groove 7c is 0.5 mm, the depth of the gas-flow regulating groove 7c is 0.75 mm, and the formation position of the positioning projection 7b and the formation position of the gas-flow regulating groove 7c are set to have a distance of 3 mm from the front end of the nozzle body 7a. Additionally, six positioning projections 7b and six gas-flow regulating grooves 7c are respectively formed on the inner peripheral surface of the nozzle body 7a at intervals of 60° as shown in FIG. 4 and FIG. 6. The cross-sectional shape of the positioning projection 7b is substantially trapezoidal so that the top surface of the positioning projection 7b becomes circular-arc, and the cross-sectional shape of the gas-flow regulating groove 7c is like the capital letter U. The span between the two positioning projections 7b facing each other is set at 1.7 mm, which is 0.1 mm larger than the outer diameter of the tungsten electrode rod 2 so that the tungsten electrode rod 2 can be slidably held between each pair of positioning projections 7b that are facing each other.

Next, a description will be given of the operation of the TIG welding torch using the above-mentioned constricting nozzle 7. First, the electrode collet 3 fixedly holding the tungsten electrode rod 2 is inserted into the torch body 1, and the protruding length of the tungsten electrode rod 2 is set so as to reach a state in which the conic front end of the tungsten electrode rod 2 slightly protrudes from the front end of the constricting nozzle 7 as shown in FIGS. 2 and 3.

Thereafter, a parent material W to be welded, which has been set, is positioned below the tungsten electrode rod 2 of the TIG welding torch, or, alternatively, the front end of the tungsten electrode rod 2 is positioned near a weld point of the parent material W while adjusting a holding device (not shown) that holds the TIG welding torch. Then, the distance between the front end of the tungsten electrode rod 2 and the parent material W is adjusted to be a predetermined value while rotating the collet handle 4.

Welding conditions, such as welding current, the length of the arc "a," welding speed, the supply amount of the shielding gas G, and the shape of the front end of the tungsten electrode rod 2, are set to optimum conditions in accordance with the quality of the parent material W, the thickness of the sheet, etc.

After the setting of the TIG welding torch and the parent material W is completed, a shielding gas G, such as argon gas, is allowed to flow from the shielding nozzle 6 and the constricting nozzle 7 of the TIG welding torch toward the parent material W, and a voltage is applied to the space between the tungsten electrode rod 2 and the parent material W while operating a power source (not shown), and an arc "a" is generated between the front end of the tungsten electrode rod 2 and the parent material W in the atmosphere of the shielding gas G. In the present embodiment, the above-mentioned welding is that of straight polarity (i.e., electrode negative) in which a direct current is used for the power source, and the tungsten electrode rod 2 is connected to the negative electrode of a DC welder in order to perform welding.

The shielding gas G supplied into the torch body 1 flows down through the gas passage 5a of the holder 5' of the gas lens 5, and then a part or portion of the shielding gas G flows into the annular gas chamber 5g from the gas flow holes 5h, and the remaining part or portion thereof flows into the high-speed gas passage 7d of the constricting nozzle 7 from the gas passage 5a.

The shielding gas G that has flowed into the annular gas chamber 5g passes through the filter 5", and is homogenized and diffused, and is discharged from the shielding nozzle 6 toward the surroundings of the arc "a" in the form of a laminar flow gas G1. The shielding gas G that has flowed into the high-speed gas passage 7d is accelerated to be a high-speed gas G2, and is regulated by passing through the gas-flow regulating grooves 7c, and is linearly discharged toward the surroundings of the arc "a" from the opening of the front end of the nozzle body 7a in the form of a high-speed regulated gas G3.

The high-speed regulated gas G3 that has passed through the gas-flow regulating grooves 7c is stabilized at a downstream-side part of the high-speed gas passage 7d, and is stably discharged from the opening of the front end of the nozzle body 7a because the positioning projections 7b and the gas-flow regulating grooves 7c are disposed a distance apart from the front end of the nozzle body 7a.

Figure 7:
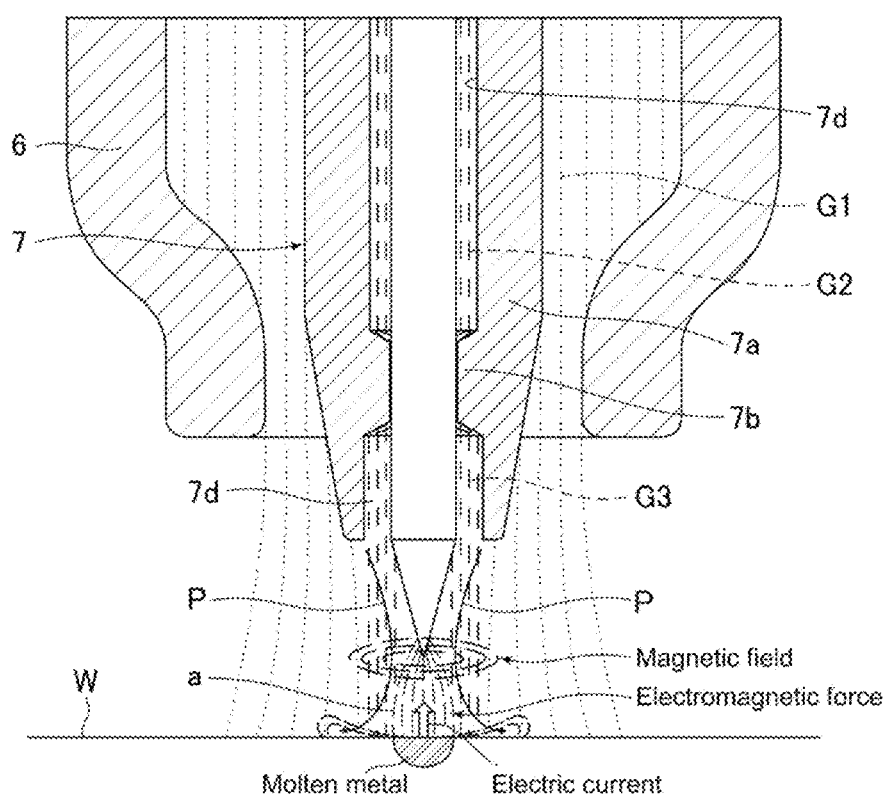
FIG. 7 is a schematic diagram for describing a force acting on an arc in accordance with the present invention.

The arc "a" generated between the front end of the tungsten electrode rod 2 and the parent material W spreads from the tungsten electrode rod 2 toward the parent material W as shown in FIG. 7, and, therefore, the tungsten electrode rod 2 is higher in the internal pressure of the arc "a" than the parent material W. As a result, a part or portion of the shielding gas G is drawn into the arc "a," and a high-speed gas flow that is called plasma airflow P is generated. This plasma airflow P greatly influences the formation of weld penetration of the parent material W, and also influences the directivity and the rigidity (i.e., properties of the arc "a" retaining its shape) of the arc "a" and, hence, the directivity and the rigidity of the arc "a" can be increased in proportion to an increase in the speed of the plasma airflow P. The arc "a" generated in this manner is narrowed down by a thermal pinch effect brought about by the high-speed regulated gas G3 discharged from the constricting nozzle 7, and becomes a stable arc "a" having a high energy density.

When such a stable arc "a" is generated, the TIG welding torch is run and moved along weld points of the parent material W at a predetermined speed. As a result, the weld points of the parent material W are melted and joined together by the heat of the arc "a" generated between the front end of the tungsten electrode rod 2 and the parent material W.

The TIG welding torch using the above-mentioned constricting nozzle 7 is arranged so that a part or portion of the shielding gas G is formed into a high-speed regulated gas G3 that is faster than a laminarized shielding gas G to be discharged from the shielding nozzle 6 by means of the constricting nozzle 7, and the resulting high-speed regulated gas G3 is allowed to flow toward the surroundings of the arc "a," and, therefore, the speed of the plasma airflow P that runs toward the parent material W to be welded from the side of the tungsten electrode rod 2 reaches a speed (e.g., about 200 to 300 m/sec) that is two times to three times as high as a conventional speed (i.e., about 100 m/sec). Additionally, the magnetic field acting on the arc "a" and the electromagnetic force in the central axial direction are strengthened, and the energy density of the arc "a," the directivity of the arc "a," and the rigidity of the arc "a" can be heightened (increased), respectively, and hence a stable arc "a" can be obtained. As a result, the use of the above-mentioned TIG welding torch makes it possible to perform high-speed welding at a welding speed (e.g., 1000 mm/min to 7000 mm/min) that is five times to twenty times as high as the conventional welding speed, and makes it possible to perform high-quality stable welding in which the bead width is uniform on the obverse and reverse sides, and in which the waveform intervals of the bead are equal.

Additionally, the TIG welding torch allows the shielding gas G to flow from the constricting nozzle 7 in the form of a high-speed regulated gas G3, and makes it possible to perform high-speed welding. Therefore, the shielding gas G is never influenced by wind during welding, and crystals are prevented from becoming coarse by rapid heating and rapid cooling of a heat-affected zone, and the bending ductility of the weld metal is improved. Additionally, the TIG welding torch can prevent metallic vapors (impurities) generated from a molten pool because of the high-speed plasma airflow P re-adhering to, and re-mixing with, a molten metal, and thus high-quality welding can be performed. Still additionally, this TIG welding torch can perform dual sealing by means of a high-speed regulated gas G3 that is allowed to flow toward the surroundings of the arc "a," and by means of a laminarized shielding gas G that is allowed to flow toward its outside. Therefore, the shielding effect is enhanced, and this makes it possible to reliably prevent air from intruding into a molten pool, and makes it possible to perform welding in which the oxide film of a surface bead is slight (minimized), and in which the surface of the bead is lustrous, and this makes it possible to lengthen the lifetime of the tungsten electrode rod 2. Additionally, the TIG welding torch discharges the shielding gas G in the form of a high-speed regulated gas G3 by narrowing down the shielding gas G by means of the constricting nozzle 7, and, therefore, the shielding gas G becomes satisfactorily small in the amount used, and costs can be reduced. Additionally, the TIG welding torch includes the positioning projections 7b and the gas-flow regulating grooves 7c respectively disposed at regular intervals of an angle in the circumferential direction of the inner peripheral surface of the nozzle body 7a, and this structure allows a high-speed regulated gas G3 to evenly flow from the front end of the nozzle body 7a toward the surroundings of an arc "a." Therefore, a plasma airflow P flowing from the tungsten electrode rod 2 toward the parent material W evenly runs, and it is possible to form a circular arc "a" whose cross-sectional shape has high circularity, and the arc "a" becomes stable during welding.

Figure 18:
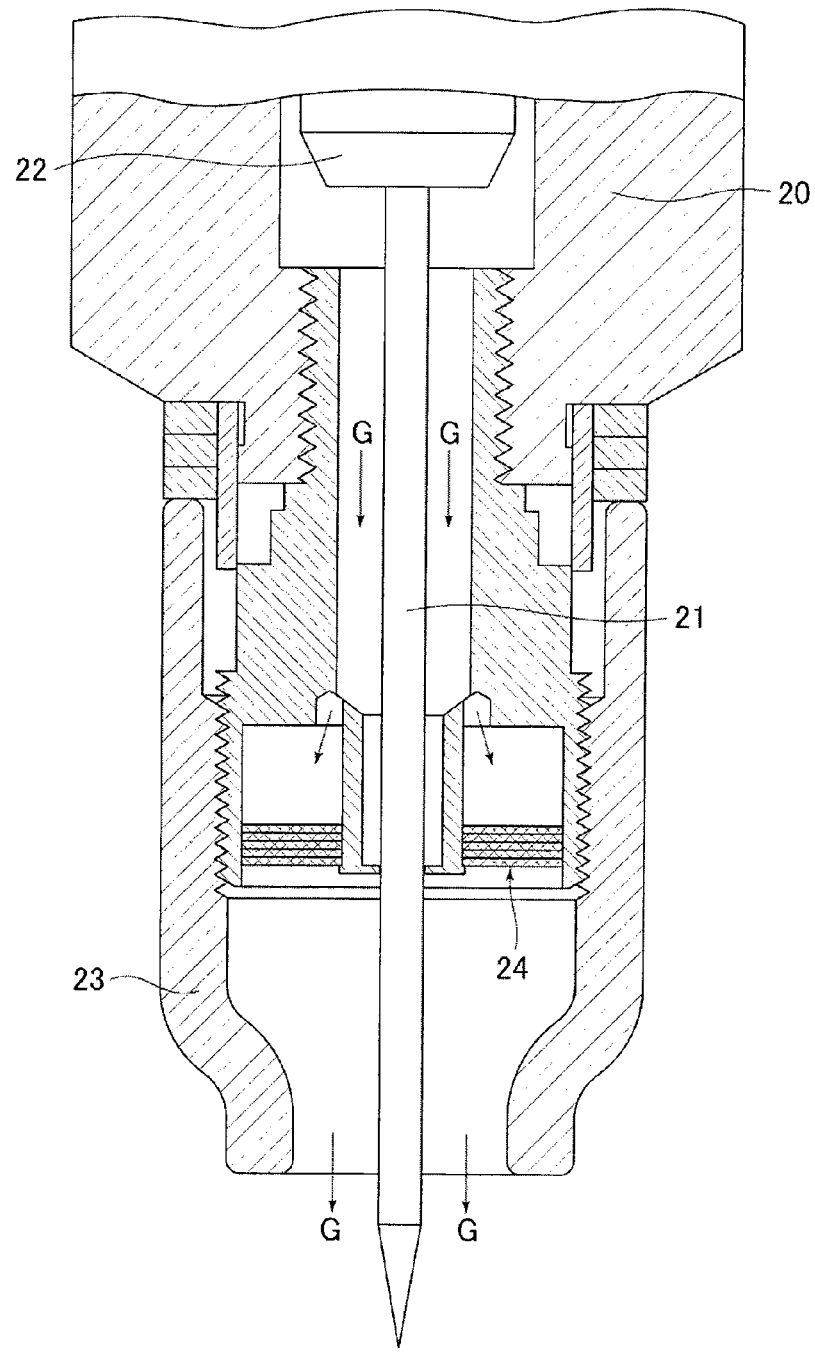
FIG. 18 is an enlarged longitudinal sectional view of a main part or portion of a conventional TIG welding torch that uses only a shielding nozzle.
Figure 19:
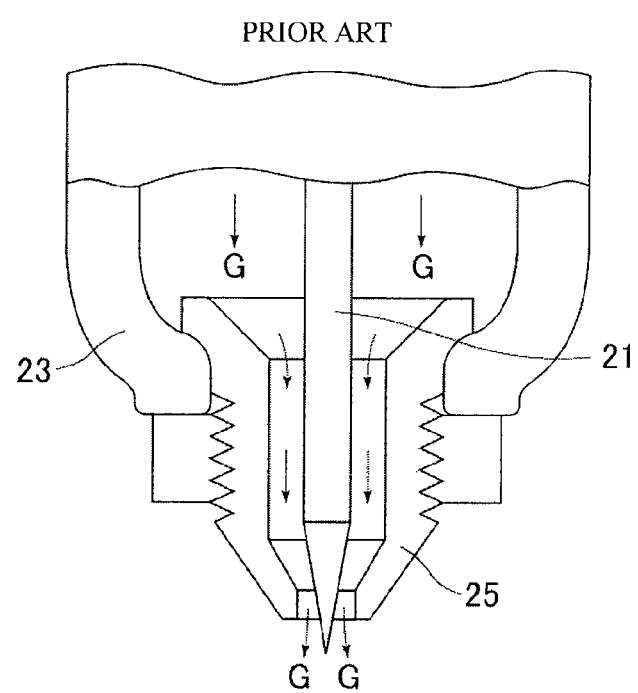
FIG. 19 is an enlarged longitudinal sectional view of a main part or portion of a TIG welding torch that uses a shielding nozzle and a conventional constricting nozzle.

Table 1 shown below is a table of a comparison of effects among the conventional TIG welding torch (shown in FIG. 18) using only the shielding nozzle 23 described previously, the conventional TIG welding torch (shown in FIG. 19) using the shielding nozzle 23 and the constricting nozzle 25, and the TIG welding torch using the constricting nozzle 7 of the present invention. As is apparent from Table 1, the TIG welding torch using the constricting nozzle 7 of the present invention achieves a more excellent effect in all aspects, such as the directivity of an arc "a," welding speed, shielding effect, and welding quality, than the conventional TIG welding torch using the shielding nozzle 23 or the constricting nozzle 25.

TABLE 1

|  | TIG welding torch using the conventional shielding nozzle | TIG welding torch using the conventional constricting nozzle | TIG welding torch using the constricting nozzle of the present invention | Remarks |
| --- | --- | --- | --- | --- |
| Arc directivity | Small | Average | Excellent | The present invention can homogenize beads on the obverse and reverse sides |
| Stability of electric current | Small | Average | Excellent | The present invention is excellent in the linearity of beads |
| Welding speed | Low speed | Medium speed | High speed | The present invention can improve productivity |
| Shielding effect | Average | Small | Great | The present invention can improve quality |
| Welding quality | Average | Average | Excellent | The present invention can perform high-strength welding |

TABLE 1-continued

|  | TIG welding torch using the conventional shielding nozzle | TIG welding torch using the conventional constricting nozzle | TIG welding torch using the constricting nozzle of the present invention | Remarks |
| --- | --- | --- | --- | --- |
| Concentricity | Average | Average | Excellent | The present invention can improve workability |
| Electrode lifetime | Short | Average | Long | The present invention can improve workability and can maintain high quality |

(A) and (B) of FIG. 8 are photographic views showing that stainless steel sheets are butted and welded together, and the resulting welded part is subjected to an Erichsen test under the same welding conditions by use of a TIG welding torch using the conventional constricting nozzle 25 (shown in FIG. 19) and by use of a TIG welding torch using the constricting nozzle 7 of the present invention. More specifically, (A) of FIG. 8 is a view of a welded part of stainless steel sheets that are butted and welded together by use of the TIG welding torch using the conventional constricting nozzle 25, and (B) of FIG. 8 is a view of a welded part of stainless steel sheets that are butted and welded together by use of the TIG welding torch using the constricting nozzle 7 of the present invention. As is apparent from photographs of FIG. 8, cracks have appeared in the welded part made using the TIG welding torch using the conventional constricting nozzle 25, whereas cracks have not appeared in the welded part made using the TIG welding torch using the constricting nozzle 7 of the present invention. Hence, it is understood from FIGS. 8 (A) and 8 (B) that butt welding superior in strength to the conventional butt welding can be performed using the TIG welding torch using the constricting nozzle 7 in accordance with the present invention.

Second Embodiment

Figure 9:
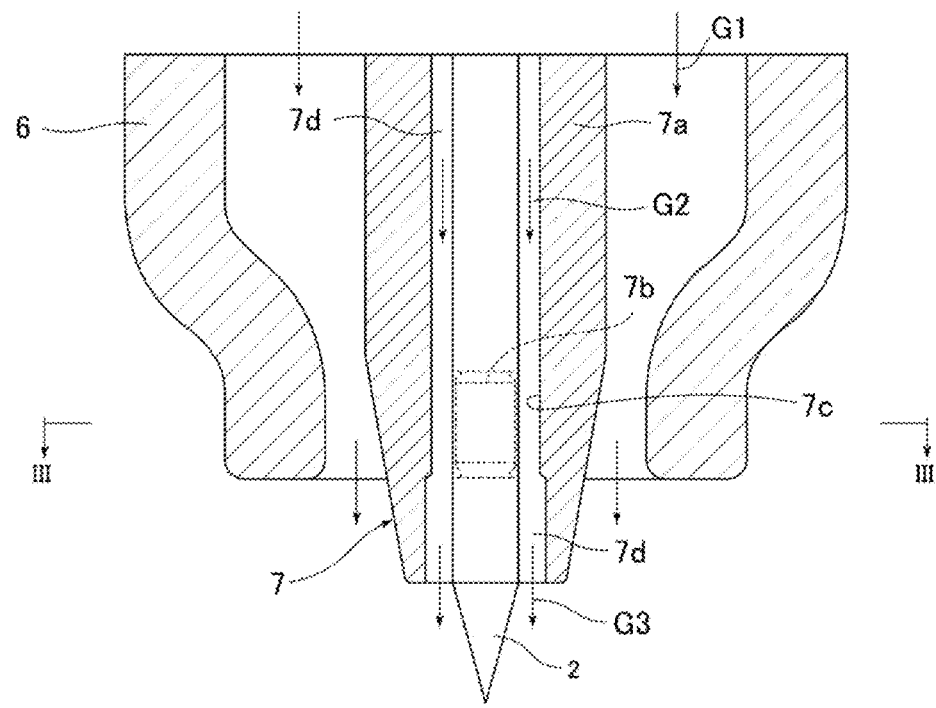
FIG. 9 is an enlarged longitudinal sectional view of a main part or portion of a TIG welding torch using a constricting nozzle according to a second embodiment of the present invention.
Figure 10:
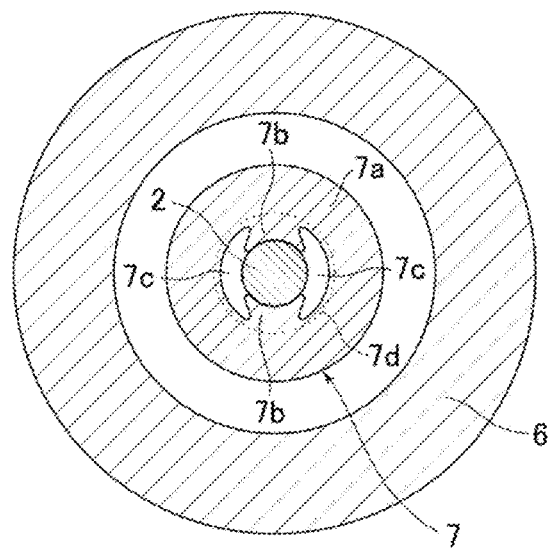
FIG. 10 is a sectional view along line III-III of FIG. 9.

FIG. 9 and FIG. 10 show a main part of a TIG welding torch using a constricting nozzle 7 according to a second embodiment of the present invention, wherein the constricting nozzle 7 has each gas-flow regulating groove 7c disposed on the inner peripheral surface of the nozzle body 7a so that a large amount of high-speed regulated gas G3 can flow from the opening of the front end of the nozzle body 7a toward a mutually facing position around an arc "a."

In other words, as shown in FIG. 10, the constricting nozzle 7 is arranged such that two positioning projections 7b and two gas-flow regulating grooves 7c are respectively disposed on the inner peripheral surface of the nozzle body 7a at intervals of 180° in the circumferential direction. With this configuration, a larger amount of high-speed regulated gas G3 is allowed to flow from the front end of the nozzle body 7a toward the mutually facing position around the arc "a," whereas a smaller amount of high-speed regulated gas G3 is allowed to flow toward the other positions.

Figure 11:
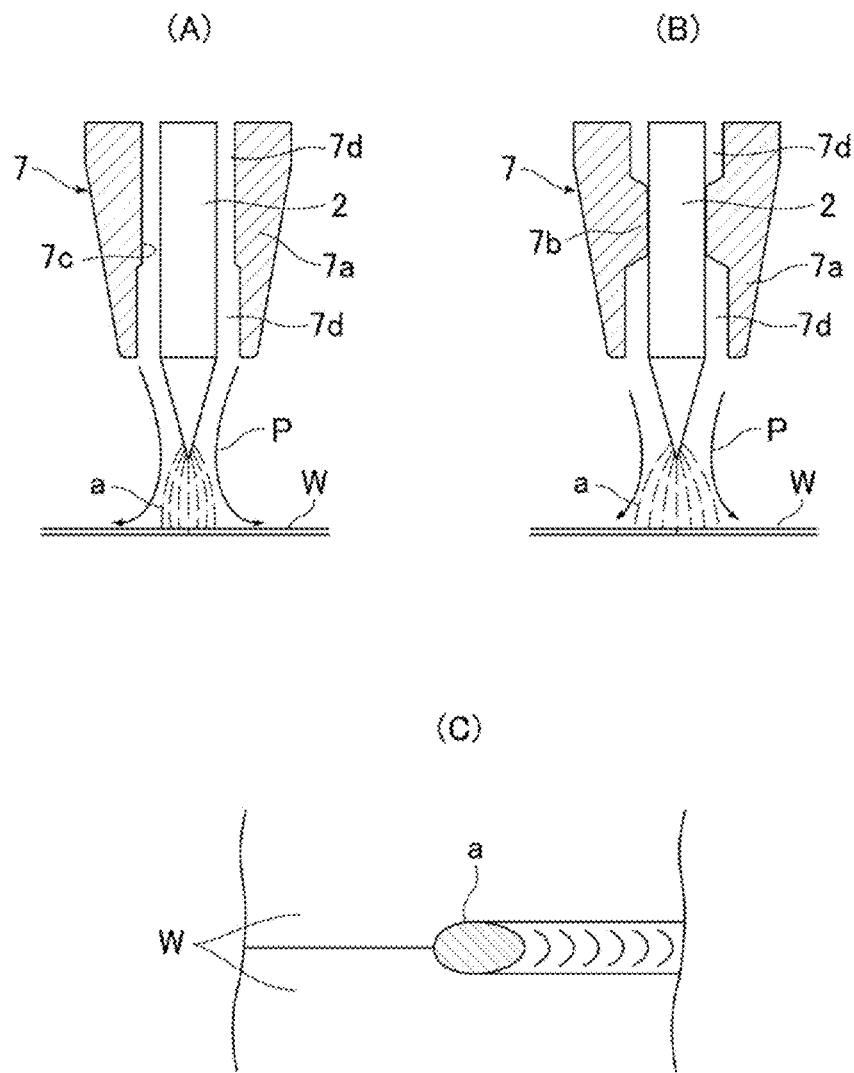

The TIG welding torch using the constricting nozzle 7 can form an arc "a" whose cross-sectional shape is elliptical and that has a high energy density because a strong part or portion and a weak part or portion of the plasma airflow P alternately appear at intervals of 90° in the circumferential direction of the arc "a" as shown in (A) to (C) of FIG. 11. If an arc "a," whose cross-sectional shape is elliptical, is formed in this way, then the preheating effect will be increased, and the weld penetration will be enhanced, and an "Uranami" (penetration bead) will easily occur. Moreover, excellent welding can be performed even if the electric current is increased.

The number of positioning projections 7b of the constricting nozzle 7, the number of gas-flow regulating grooves 7c of the constricting nozzle 7, the cross-sectional shape, the size, the positional relationship, etc., are not limited to those of the above-mentioned embodiments. Of course, in accordance with the present invention, the number, the cross-sectional shape, the size, the positional relationship, etc., can be appropriately changed if the embodiment can allow a high-speed regulated gas G3 to flow toward the surroundings of the arc "a."

Third Embodiment

A constricting nozzle according to a third embodiment of the present invention is arranged such that a plurality of positioning projections and a plurality of gas-flow regulating grooves (not shown) are formed on the inner peripheral surface of the nozzle body at regular intervals of an angle in the circumferential direction and spirally in the same directions, respectively, and such that a swirling high-speed regulated gas is allowed to flow from the opening of the front end of the nozzle body toward the surroundings of an arc "a."

The constricting nozzle according to this third embodiment is arranged to allow a swirling high-speed regulated gas to flow from the opening of the front end of the nozzle body toward the surroundings of an arc "a," and, therefore, the arc "a" becomes tauter by means of the swirling high-speed regulated gas. The result is the same operational effect as in the constricting nozzle 7 according to the first embodiment, which can be obtained reliably and excellently. Additionally, the constricting nozzle according to the third embodiment is arranged such that a swirling high-speed regulated gas that has collided with the surface of a parent material quickly wraps and discharges metallic vapors generated from a molten pool to the outside. Therefore, the shielding effect of a molten metal is enhanced, and the metallic vapors can be prevented from re-adhering to, and re-mixing with, the molten metal, and hence a high-quality weld metal can be produced.

Fourth Embodiment

FIG. 12 to FIG. 16 show a constricting nozzle according to a fourth embodiment of the present invention, and a TIG welding torch using this constricting nozzle. This TIG welding torch is chiefly used when ends of thin metal sheets, such as stainless steel sheets or magnetic steel sheets, are butted and welded together, and is composed of a cylindrical torch body 1 that allows a shielding gas G, such as argon gas or helium gas, to flow through its inside, an electrode collet 3 that is screwed and inserted into the torch body 1 from above so as to be movable up and down and be rotatable and that attachably and detachably holds a tungsten electrode rod 2, a collet handle 4 that is attached to the upper end of the electrode collet 3 and that moves the electrode collet 3 upwardly and downwardly with respect to the torch body 1 while rotating the electrode collet 3 in normal and reverse directions, and a gas lens 5 that is detachably attached to the lower end of the torch body 1 and that homogenizes, diffuses, and laminarizes a shielding gas G that has flowed through the inside of the torch body 1. Furthermore, the TIG welding torch of this embodiment includes a cylindrical shielding nozzle 6 that is detachably attached to the gas lens 5 or to the torch body 1 in a state of surrounding the forward end of the tungsten electrode rod 2 and that discharges the shielding gas G laminarized by the gas lens 5 toward the surroundings of an arc "a," and a constricting nozzle 7 that is disposed around the forward end of the tungsten electrode rod 2 and that allows a swirling high-speed regulated gas G3' toward the surroundings of the arc "a."

Figure 12:
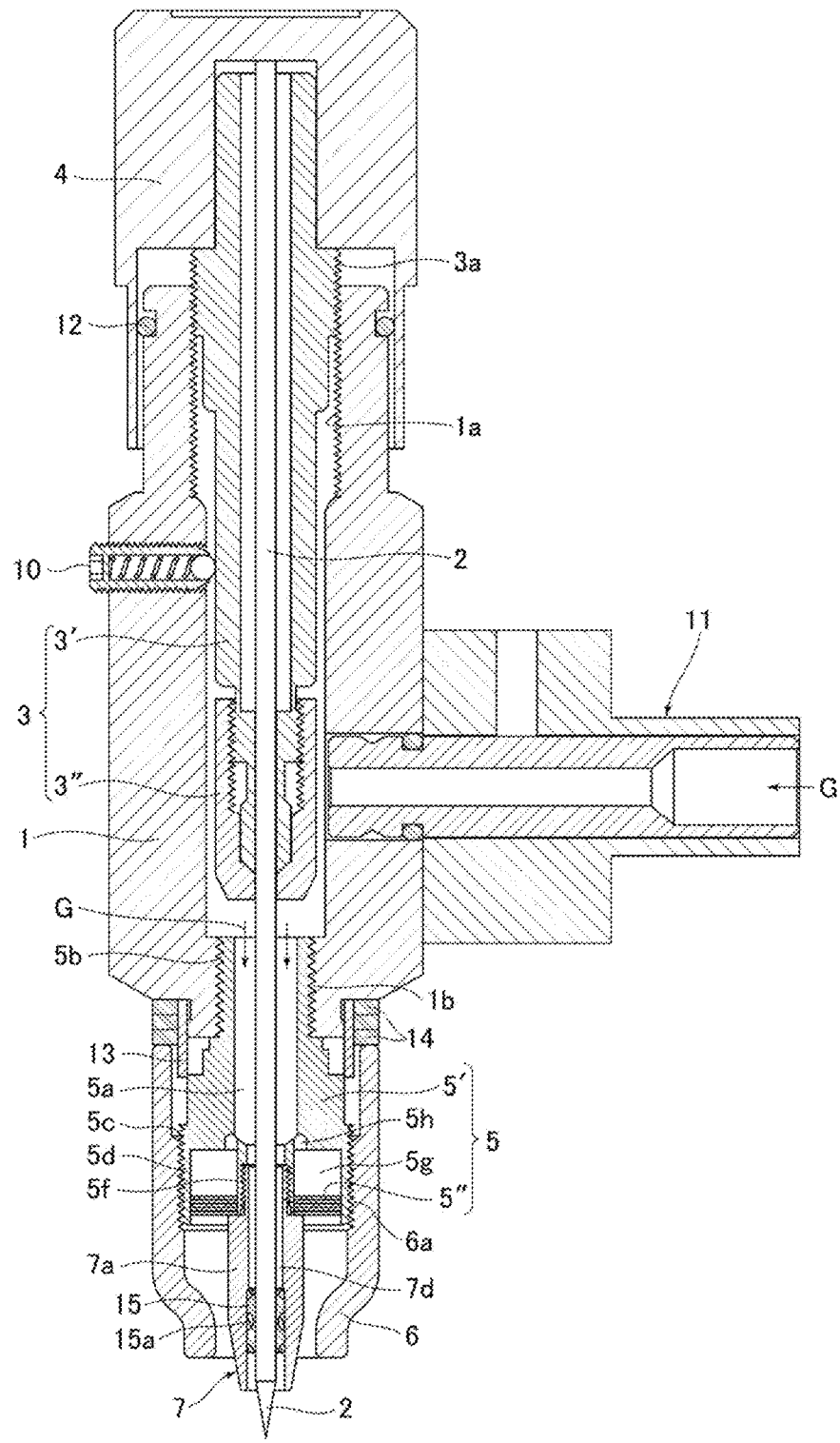
FIG. 12 is a longitudinal sectional view of a TIG welding torch using a constricting nozzle according to a fourth embodiment of the present invention.

In FIG. 12, reference numeral 10 designates a pressure adjusting screw that is disposed at the torch body 1 and that holds the electrode collet 3 at an adjusted position by applying appropriate rotational resistance to the electrode collet 3, reference numeral 11 designates an electrode/main-gas-pipe connecting metal piece fixed to the torch body 1, reference numeral 12 designates an O-ring that seals a gap between the torch body 1 and the collet handle 4, reference numeral 13 designates a rubber ring for sealing gas that is interposed between the torch body 1 and the gas lens 5, and reference numeral 14 designates an adjusting ring that is made of plastic and that is interposed between the torch body 1 and the shielding nozzle 6. Thus, the same reference numeral is given to the same member/part as that of the TIG welding torch shown in FIGS. 1 to 3, and a detailed description of the same member/part is therefore omitted.

Figure 13:
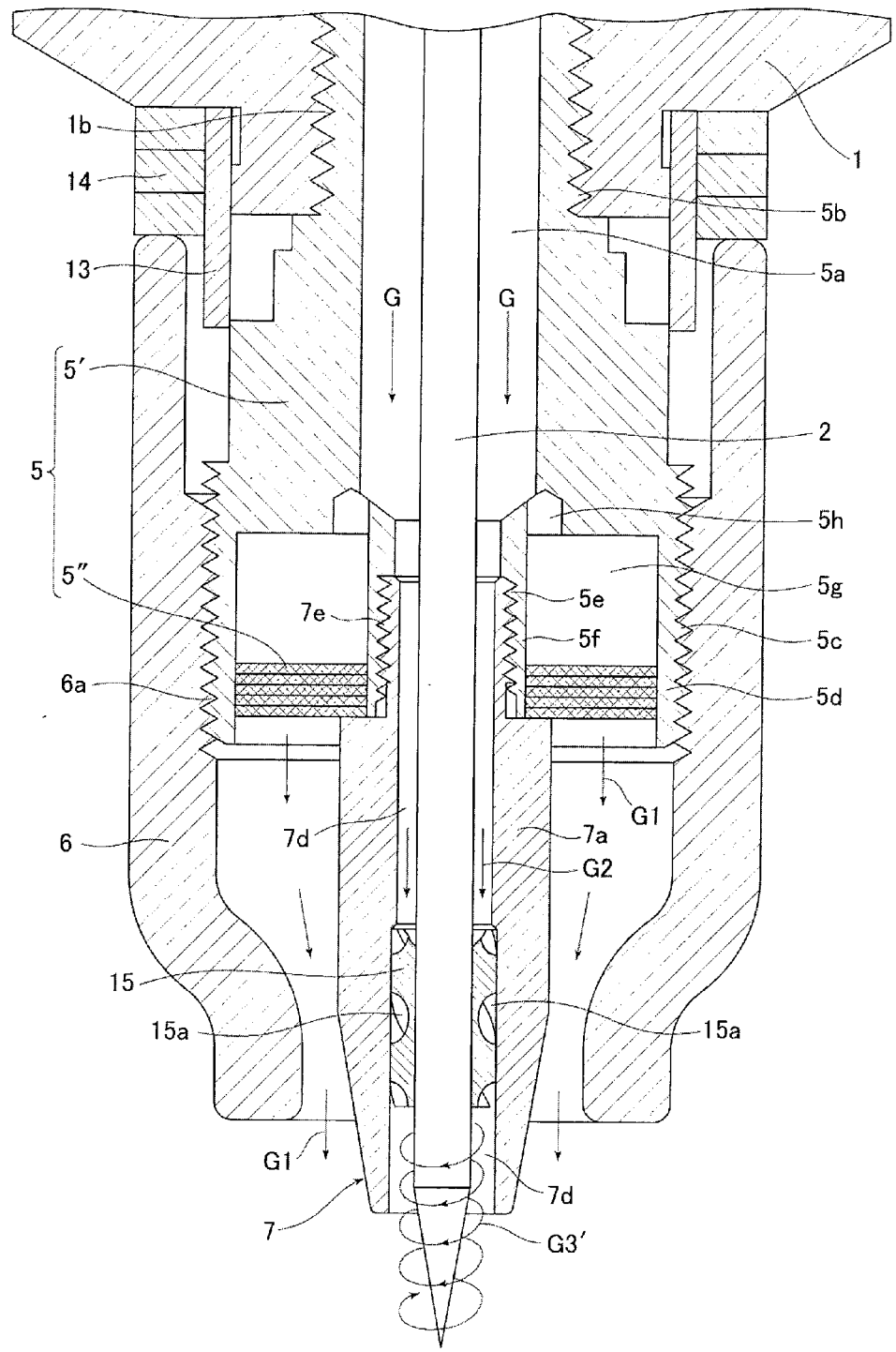
FIG. 13 is an enlarged longitudinal sectional view of a main part or portion of the TIG welding torch shown in FIG. 12.
Figure 14:
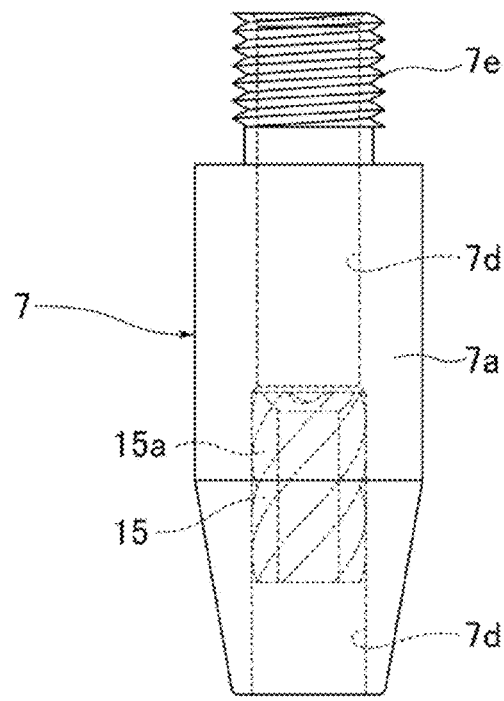
FIG. 14 is an enlarged front view of a constricting nozzle according to the fourth embodiment of the present invention.
Figure 15:
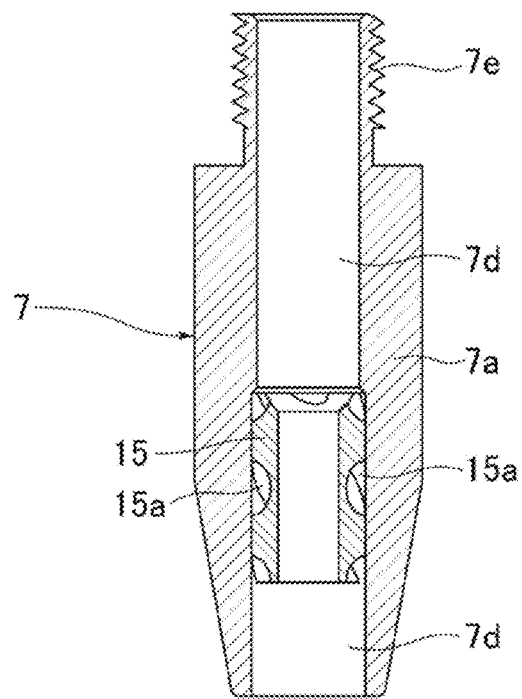
FIG. 15 is an enlarged longitudinal sectional view of the constricting nozzle according to the fourth embodiment of the present invention.

As shown in FIG. 12 and FIG. 13, the constricting nozzle according to the fourth embodiment of the present invention is disposed around the forward end of the tungsten electrode rod 2, and defines an annular high-speed gas passage 7*d* between the constricting nozzle and the forward end of the tungsten electrode rod 2, so that a part of the shielding gas G flowing through the gas passage 5*a* of the holder 5' of the gas lens 5 from the inside of the torch body 1 is allowed to flow through the high-speed gas passage 7*d*. Consequently, the shielding gas G is changed into a swirling high-speed regulated gas G3' that is faster than the laminarized shielding gas G discharged from the shielding nozzle 6, and the resulting swirling high-speed regulated gas G3' is allowed to flow from the opening of the front end of the nozzle body 7*a* toward the surroundings of an arc "a."

In detail, as shown in FIGS. 12 to 16, the constricting nozzle 7 is disposed around the forward end of the tungsten electrode rod 2 concentrically with the tungsten electrode rod 2. The constricting nozzle 7 is composed of a cylindrical nozzle body 7*a* that defines the annular high-speed gas passage 7*d* between the nozzle body 7*a* and the outer peripheral surface of the forward end of the tungsten electrode rod 2, and a cylindrical spiral metal piece 15 that is inserted in the inside of the forward end of the nozzle body 7*a*, and that holds the tungsten electrode rod 2 by its inner peripheral surface in the center position of the nozzle body 7*a*, and that has a plurality of spiral gas-flow regulating grooves 15*a*, which regulate and swirl the shielding gas G flowing through the high-speed gas passage 7*d*, on its outer peripheral surface.

In more detail, the nozzle body 7*a* is cylindrically formed so as to taper the outer peripheral surface of its forward end (i.e., its lower end) by use of a copper material (beryllium copper) excellent in electric conductivity, strength, etc., and has a male thread 7*e*, which is screwed and detachably attached to the supporting cylinder part 5*f* of the holder 5' of the gas lens 5, on the outer peripheral surface of its base (i.e., its upper end). The nozzle body 7*a* is attached to the center position of the forward end surface of the gas lens 5 by screwing the male thread 7*e* to the supporting cylinder part 5*f*. With this configuration, the nozzle body 7*a* is disposed around the forward end of the tungsten electrode rod 2 concentrically with the tungsten electrode rod 2 and with the shielding nozzle 6, and defines an annular high-speed gas passage 7*d* between the nozzle body 7*a* and the outer peripheral surface of the forward end of the tungsten electrode rod 2.

The inner diameter of the forward end (lower end) of the nozzle body 7*a* is larger than the inner diameter of the base (its upper end) of the nozzle body 7*a*, and the spiral metal piece 15 is inserted into the inside of the forward end of the nozzle body 7*a*.

Figure 16:
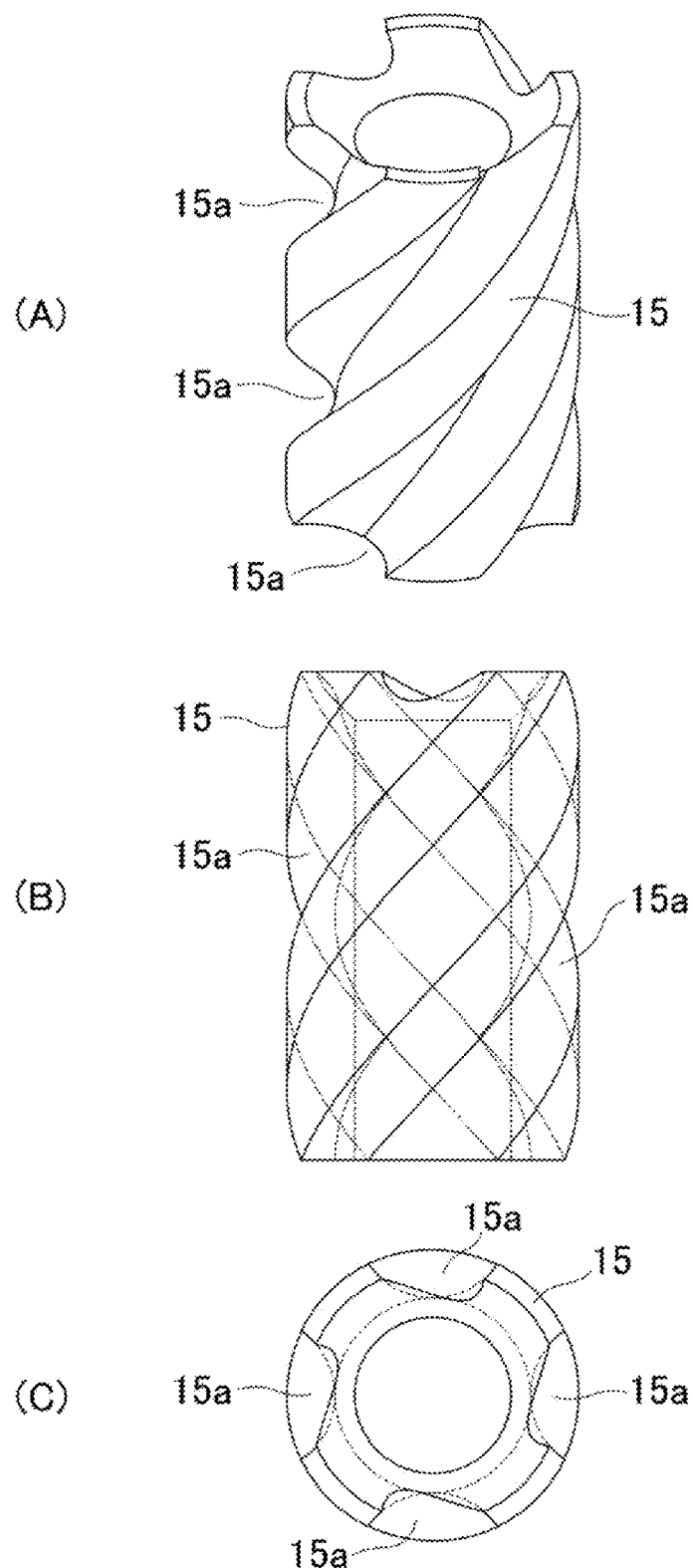

On the other hand, the spiral metal piece 15 is cylindrically made of a copper material (beryllium copper) excellent in electric conductivity, strength, etc., and holds the tungsten electrode rod 2 in the center position of the nozzle body 7*a* by its inner peripheral surface. The spiral gas-flow regulating grooves 15*a* are formed on the outer peripheral surface of the spiral metal piece 15 in the same direction, and evenly in the circumferential direction, and, consequently, the swirling high-speed regulated gas G3' can evenly flow toward the surroundings of an arc "a." In the fourth embodiment, as shown in FIG. 16, four gas-flow regulating grooves 15*a* are respectively formed on the outer peripheral surface of the spiral metal piece 15 at regular intervals of 90°, and the cross-sectional shape of the gas-flow regulating groove 15*a* is substantially semicircular as shown in FIG. 16 (C). Additionally, the spiral metal piece 15 is attached to the inside of the forward end of the nozzle body 7*a* by press-fitting to the inside of the forward end of the nozzle body 7*a*, and is inserted and set in a position apart from (i.e., at a distance from) the front end of the nozzle body 7*a*. As a result, the shielding gas G that has flowed into the high-speed gas passage 7*d* is regulated by passing through the spiral gas-flow regulating grooves 15*a*, so that the shielding gas G is then formed into a swirling high-speed regulated gas G3', and is then stabilized at a downstream-side part of the high-speed gas passage 7*d*, and is subsequently discharged from the opening of the front end of the nozzle body 7*a*.

The diameter of the tungsten electrode rod 2 used in the fourth embodiment is set at 1.6 mm. Additionally, in the fourth embodiment, the overall length of the nozzle body is 18 mm, the outer diameter of a part or portion having the largest diameter is 6 mm, the inner diameter on the base side of the nozzle body 7*a* is 2.7 mm, the inner diameter on the forward end side of the nozzle body 7*a* is 3.0 mm, and the depth of a hole on the forward end side of the nozzle body 7*a* is 8 mm. Additionally, the overall length of the spiral metal piece 15 is 5 mm, and the inner diameter of the spiral metal piece 15 is 1.6 mm, and the spiral metal piece 15 is inserted and set in a position 3 mm inward from the front end of the nozzle body 7*a*. That is, the distance between the front end of the nozzle body 7*a* and the spiral metal piece inserted in the nozzle body 7*a* is 3 mm. The inner peripheral surface of the gas-flow regulating groove 15*a* is a circular arc surface having a radius of 0.8 mm.

In the TIG welding torch using the constricting nozzle 7 according to the fourth embodiment, the constricting nozzle 7 changes a part or portion of the shielding gas G into a swirling high-speed regulated gas G3' that is faster than the laminarized shielding gas G discharged from the shielding nozzle 6. The resulting swirling high-speed regulated gas G3' is allowed to flow toward the surroundings of an arc "a," and, therefore, the TIG welding torch using the constricting nozzle 7 according to the fourth embodiment can achieve the same operational effect as the TIG welding torch (shown in FIG. 1 to FIG. 3) according to the first embodiment.

In particular, the TIG welding torch using the constricting nozzle 7 according to the fourth embodiment can obtain an arc "a" that has become tauter by means of a swirling high-speed regulated gas G3', and the same operational effect as in the TIG welding torch according to the first embodiment can be obtained reliably and excellently. Additionally, in the TIG welding torch using the constricting nozzle 7, a swirling high-speed regulated gas G3' that has collided with the surface of a parent material quickly wraps and discharges metallic vapors generated from a molten pool to the outside. Therefore, the shielding effect of a molten metal is enhanced, and the metallic vapors can be prevented from re-adhering to, and re-mixing with, the molten metal, and, hence, a high-quality weld metal can be produced.

Figure 17:
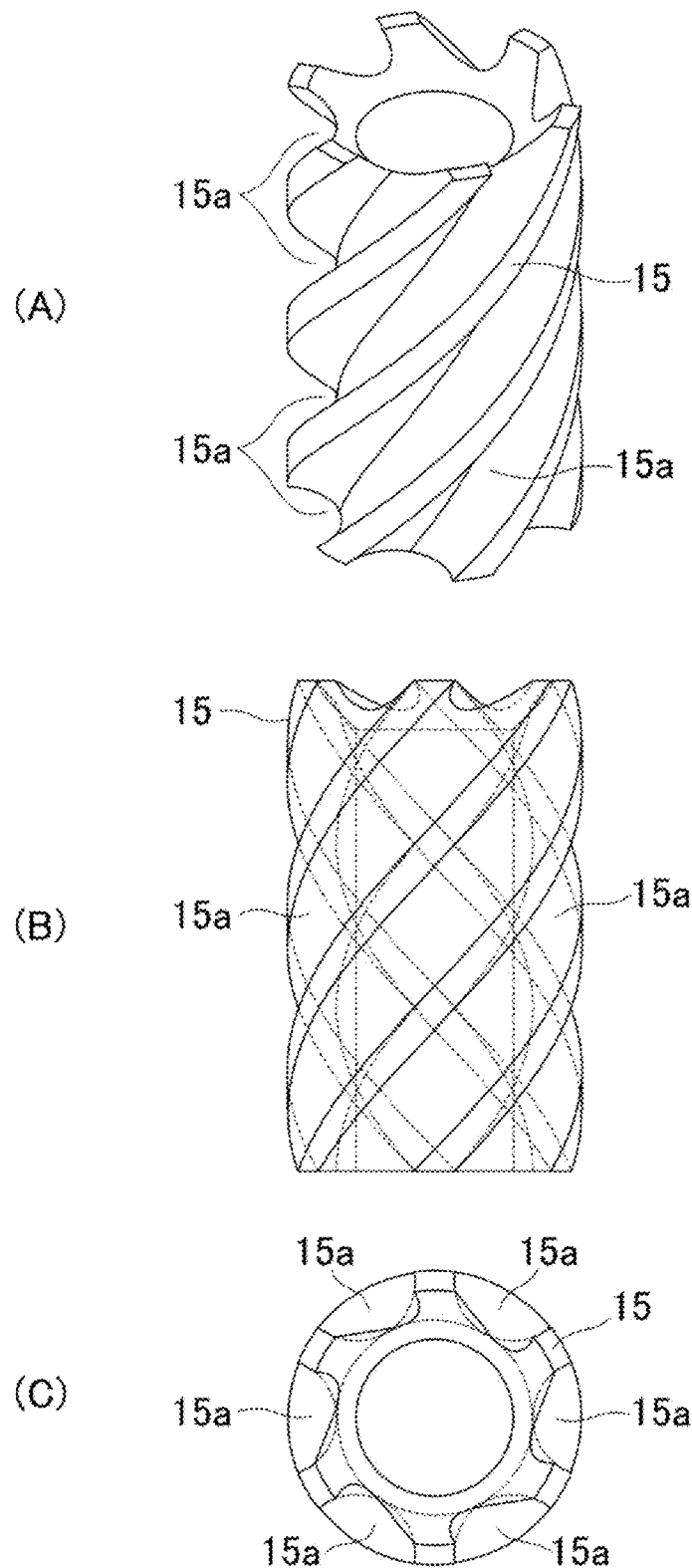

FIG. 17 shows a modification of the spiral metal piece 15 used in the constricting nozzle 7 according to the fourth embodiment, and the spiral metal piece 15 has six spiral gas-flow regulating grooves 15a arranged in the same direction on its outer peripheral surface at regular intervals of 60°. The spiral metal piece 15 has the same size as the spiral metal piece 15 shown in FIG. 16, except that six spiral gas-flow regulating grooves 15a are formed therein and the inner peripheral surface of the gas-flow regulating groove 15a is a circular arc surface having a radius of 0.6 mm, which is a smaller radius.

The number of spiral gas-flow regulating grooves 15a of the spiral metal piece 15 used in the constricting nozzle 7, the cross-sectional shape, the size, the pitch, the spiral angle, etc., are not limited to those of FIGS. 16 and 17. Of course, in accordance with the present invention, the number, the cross-sectional shape, the size, the pitch, the spiral angle, etc., can be appropriately varied in order to allow a swirling high-speed regulated gas G3' to flow toward the surroundings of an arc "a."

Generally, the various embodiments of the present invention are constructed to be capable of accelerating a plasma airflow by allowing a high-speed regulated gas to flow toward the surroundings of an arc, so as to be capable of increasing the energy density of the arc, the directivity of the arc, and the rigidity of the arc, while strengthening an electromagnetic force and a magnetic field acting on the arc. Consequently, the various embodiments of the present invention may be used to perform high-speed welding, and are capable of improving the shielding effect and performing high-quality welding. To achieve these benefits, the constricting nozzle (7) of the present invention is composed of a cylindrical nozzle body (7a) that is disposed around the forward end of the tungsten electrode rod (2) concentrically with the tungsten electrode rod (2) and defines an annular high-speed gas passage (7d) between the nozzle body (7a) and the outer peripheral surface of the forward end of the tungsten electrode rod (2), and a plurality of positioning projections (7b) are formed to protrude on the inner peripheral surface of the nozzle body (7a) with predetermined intervals in the circumferential direction and are arranged along the longitudinal direction of the nozzle body (7a) in order to hold the tungsten electrode rod (2) in the center position of the nozzle body (7a), and a plurality of gas-flow regulating grooves (7c) are formed between the positioning projections (7b) and extend in parallel in the longitudinal direction of the nozzle body (7a), and regulate the shielding gas (G) flowing through the high-speed gas passage (7d).

DESCRIPTION OF CHARACTER REFERENCES

1: Torch body, 2: Tungsten electrode rod, 3: Electrode collet, 4: Collet handle, 5: Gas lens, 6: Shielding nozzle, 7: Constricting nozzle, 7a: Nozzle body, 7b: Positioning projection, 7c: Gas-flow regulating groove, 7d: High-speed gas passage, 15: Spiral metal piece, 15a: Spiral gas-flow regulating groove, a: Arc, G: Shielding gas, G1: Laminar flow gas, G2: High-speed gas, G3: High-speed regulated gas, G3': Swirling high-speed regulated gas, W: Parent material.

The invention claimed is:
1. A tungsten inert gas (TIG) welding torch comprising:
(a) a cylindrical torch body for providing a shielding gas;
(b) an electrode collet that is screwed and inserted into the torch body so as to be movable up and down and be rotatable, and the electrode collet attachably and detachably holds a tungsten electrode rod;
(c) a collet handle attached to an upper end of the electrode collet and that moves the electrode collet upwardly and downwardly with respect to the torch body while rotating the electrode collet in normal and reverse directions;
(d) a gas lens having a holder that is attached to a lower end of the torch body and formed in a cylindrical shape having a first gas passage for inserting the tungsten electrode rod and for flowing the shielding gas around the tungsten electrode rod from the torch body, a plurality of gas flow holes for dividing the shielding gas flowing through the first gas passage, and an annular filter for laminarizing a first shielding gas flowing through the plurality of gas flow holes;
(e) a constricting nozzle having a nozzle body attached to a center portion of the annular filter and formed in a cylindrical shape having a second gas passage for inserting the tungsten electrode rod and for flowing a second shielding gas around the tungsten electrode rod from the first gas passage without flowing through the plurality of gas flow holes, a plurality of positioning projections provided on an inner peripheral surface of the nozzle body for slidably holding the tungsten electrode rod in a center position of the second gas passage, and a plurality of gas-flow regulating grooves arranged between the positioning projections and that regulate the second shielding gas; and
(f) a cylindrical shielding nozzle that is attached to the gas lens or to the torch body so as to surround the constricting nozzle and discharge the first shielding gas laminarized by the annular filter through a gap between an outer face of the constricting nozzle and the inner surface of the cylindrical shielding nozzle, wherein a tip of the constricting nozzle projects from an opening of a lower end of the cylindrical shielding nozzle;
wherein the constricting nozzle is constructed such that the second shielding gas discharged from the constricting nozzle is faster than the first shielding gas laminarized by the annular filter and discharged from the shielding nozzle.

2. The tungsten inert gas (TIG) welding torch according to claim 1, wherein the constricting nozzle is detachably attached to a center position of a forward end surface of the gas lens.

3. The tungsten inert gas (TIG) welding torch according to claim 1, wherein the plurality of positioning projections and the plurality of gas-flow regulating grooves are respectively formed linearly along a longitudinal direction of the nozzle body.

4. The tungsten inert gas (TIG) welding torch according to claim 1, wherein the plurality of positioning projections and the plurality of gas-flow regulating grooves are respectively formed spirally.

5. The tungsten inert gas (TIG) welding torch according to claim 1, wherein the plurality of gas-flow regulating grooves are evenly disposed on the inner peripheral surface of the nozzle body.

6. The tungsten inert gas (TIG) welding torch according to claim 1, wherein the plurality of positioning projections and the plurality of gas-flow regulating grooves are formed at a distance from the front end of the nozzle body so as to be apart from the front end of the nozzle body, and a first inner diameter of the second gas passage positioned downstream of the positioning projections and the gas-flow regulating grooves is larger than a second inner diameter of the second gas passage positioned upstream of the positioning projections and the gas-flow regulating grooves.

\* \* \* \* \*